United States Patent
Takeda et al.

(10) Patent No.: US 9,801,159 B2
(45) Date of Patent: Oct. 24, 2017

(54) BASE STATION APPARATUS, MOBILE TERMINAL APPARATUS AND COMMUNICATION CONTROL METHOD

(75) Inventors: Kazuaki Takeda, Tokyo (JP); Nobuhiko Miki, Tokyo (JP); Hidekazu Taoka, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 429 days.

(21) Appl. No.: 13/261,499

(22) PCT Filed: Apr. 21, 2011

(86) PCT No.: PCT/JP2011/059846
§ 371 (c)(1),
(2), (4) Date: Jan. 4, 2013

(87) PCT Pub. No.: WO2011/136125
PCT Pub. Date: Nov. 3, 2011

(65) Prior Publication Data
US 2013/0094449 A1 Apr. 18, 2013

(30) Foreign Application Priority Data
Apr. 30, 2010 (JP) ................... 2010-105939

(51) Int. Cl.
*H04W 72/04* (2009.01)
*H04W 72/12* (2009.01)
(Continued)

(52) U.S. Cl.
CPC ............... *H04W 72/04* (2013.01); *H04L 1/06* (2013.01); *H04L 1/1854* (2013.01);
(Continued)

(58) Field of Classification Search
CPC ... H04W 28/04; H04W 72/04; H04W 72/042; H04W 88/08; H04L 5/0007
See application file for complete search history.

(56) References Cited

U.S. PATENT DOCUMENTS

| 8,531,962 | B2* | 9/2013 | Chen | H04L 1/1854 370/236 |
| 8,787,281 | B2* | 7/2014 | Takeda | H04W 72/042 370/329 |

(Continued)

FOREIGN PATENT DOCUMENTS

| CN | 101657018 A | 2/2010 |
| WO | 2009129343 A1 | 10/2009 |
| WO | 2011/020381 A1 | 2/2011 |

OTHER PUBLICATIONS

TS 36.213 et al., titled "3rd Generation Partnership Project Technical Specification Group Radio Access Network Further Advancements for E-UTRA Physical Layer Aspects (Release 9)," (36.213 hereinafter) was presented as Technical Specification 3GPP TS 36.213 V8.6.0 (Mar. 2009), pp. 01-77.*

(Continued)

*Primary Examiner* — Andrew Lai
*Assistant Examiner* — Hoyet H Andrews, III
(74) *Attorney, Agent, or Firm* — Osha Liang LLP

(57) ABSTRACT

The present invention provides a base station apparatus, a mobile terminal apparatus and a communication control method that can adequately allocate resources of response signals for retransmission for spatially-multiplexed signals respectively corresponding to a plurality of layers via the uplink and that support next-generation mobile communication systems. Discloses is a configuration to receive signals in which a plurality of layers are spatially-multiplexed on the uplink from a mobile terminal apparatus (10), generate HARQ ACK/NACK for signals received in the layers on the uplink, and allocate HARQ ACK/NACK for transport blocks associated with the layers, to PHICH resources, using the offset values that are fixedly defined in advance with the mobile terminal apparatus (10) for every uplink layer.

14 Claims, 15 Drawing Sheets

(51) Int. Cl.
H04L 1/18 (2006.01)
H04L 1/06 (2006.01)
H04L 1/00 (2006.01)
H04L 5/00 (2006.01)

(52) U.S. Cl.
CPC ....... *H04W 72/1263* (2013.01); *H04L 1/0003* (2013.01); *H04L 1/0009* (2013.01); *H04L 1/0026* (2013.01); *H04L 1/0038* (2013.01); *H04L 5/0053* (2013.01)

(56) References Cited

U.S. PATENT DOCUMENTS

| | | | | |
|---|---|---|---|---|
| 2009/0109906 | A1* | 4/2009 | Love | H04L 1/0026 370/329 |
| 2009/0245187 | A1* | 10/2009 | Nam | H04L 1/1858 370/329 |
| 2009/0262856 | A1* | 10/2009 | Onggosanusi | H04B 7/0413 375/267 |
| 2009/0268685 | A1* | 10/2009 | Chen | H04L 1/1854 370/329 |
| 2013/0058286 | A1* | 3/2013 | Takeda | H04W 72/042 370/329 |

OTHER PUBLICATIONS

R1-100871, titled "PHICH for LTE-A", was presented as Agenda Item: 7.1.2, Document for: Discussion and Decision, 3GPP TSG RAN WG1 meeting #60, San Francisco, USA, Feb. 22-26, 2010, Source: CATT.*
TS 36.211 et al., titled "3rd Generation Partnership Project Technical Specification Group Radio Access Network Evolved Universal Terrestrial Radio Access (E-UTRA)_Physical Channels and Modulation (Release 9)," (36.211 hereinafter) was presented as Technical Specification, 3GPP TS 36.211 V9.1.0 (Mar. 2010), pp. 01-85.*
R1-101046, titled "Considerations on PHICH mapping in LTE-A", (R1101046 hereinafter) was presented by Huawei as Agenda Item: 7.1.2, 3GPP TSG RAN WG1 Meeting #60, San Francisco, USA, Feb. 22-26, 2010, pp. 01-05.*
R1-102109, titled "PHICH Design for UL SU-MIMO," (R1102109 hereinafter) was presented as Document for: Discussion and Decision, 3GPP TSG RAN WG1 #60bis, Agenda Item: 6.4.4, Beijing, China, Apr. 12-16, 2010, pp. 01-03.*
R1-102303, titled "Impact of HARQ Spatial Bundling to Support UL SU-MIMO", was presented as Agenda item: 6.4.1, Document for: Discussion and Decision, 3GPP TSG RAN WG1 Meeting #60bis, Beijing, China, Apr. 12-16, 2010, Source: NTT DOCOMO, Fujitsu, NEC Group, Panasonic, Sharp.*
R1-101655, titled "Investigation of Layer Shifting and HARQ Spatial Bundling for UL SU-MIMO", was presented as Agenda Item: 7.3.1, Document for: Discussion and Decision, 3GPP TSG RAN WG1 Meeting #60, San Francisco, USA, Feb. 22-26, 2010, Source: NTT DOCOMO.*
R1-094000, titled "HARQ Bundling for Uplink SU-MIMO", was presented as Agenda Item: 7.6.3 Document for: Discussion and Decision, 3GPP TSG RAN WG1 58bis, Miyazaki, Japan, Oct. 12-16, 2009, Source: Texas Instruments.*
R1-101412, titled "PHICH resources in LTE-Advanced", was presented as Agenda item: 7.1.2, Document for: Discussion and Decision, 3GPP TSG RAN WG1 Meeting #60 R1-101412, San Francisco, USA, Feb. 22-26, 2010, Source: Nokia, Nokia Siemens Networks.*
Decision to Grant in corresponding Japanese application No. 2012-209570 dated Apr. 23, 2013 (4 pages).
Ericsson; "PHICH and UL HARQ timing and association for TDD"; 3GPP TSG-RAN WG1 #52bis, R1-081524; Shenzhen, China, Mar. 31-Apr. 4, 2008 (6 pages).
Research in Motion UK Limited; "Relay Link HARQ Operation"; 3GPP TSG RAN WG1 Meeting #59, R1-094464; Jeju, Korea, Nov. 9-13, 2009 (8 pages).
Decision to Grant a Patent in corresponding Japanese application No. 2010-105939 dated Jul. 24, 2013 (4 pages).
3GPP TR 25.912 V7.1.0, "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)," Sep. 2006 (57 pages).
International Search Report issued in PCT/JP2011/059846, dated Jun. 14, 2011 (1 page).
Office Action issued in the counterpart Peruvian Patent Application No. 002107-2012/DIN, dated Dec. 12, 2016 (11 pages).
Office Action dated Nov. 10, 2016, in corresponding Canadian Patent Application No. 2,800,566 (6 pages).
Extended European Search Report dated Nov. 30, 2016, in corresponding European Patent Application No. 11774908.5 (15 pages).

* cited by examiner

WHEN ALLOCATION RB INDEX IS 30 TO 39

- Layer1

$I_l = 30$ ( $A^{(1)} = B^{(1)} = C^{(1)} = D^{(1)} = 0$ ) For layer1

|  | PHICH group | | | | | | | | | | | | |
|---|---|---|---|---|---|---|---|---|---|---|---|---|---|
| Seq. index | 0 | 1 | 2 | 3 | 4 | 5 | 6 | 7 | 8 | 9 | 10 | 11 | 12 |
| 0 | 0 | 1 | 2 | 3 | 4 | 5 | 6 | 7 | 8 | 9 | 10 | 11 | 12 |
| 1 | 13 | 14 | 15 | 16 | 17 | 18 | 19 | 20 | 21 | 22 | 23 | 24 | 25 |
| 2 | 26 | 27 | 28 | 29 | (30) | 31 | 32 | 33 | 34 | 35 | 36 | 37 | 38 |
| 3 | 39 | 40 | 41 | 42 | 43 | 44 | 45 | 46 | 47 | 48 | 49 | 50 | 51 |
| 4 | 52 | 53 | 54 | 55 | 56 | 57 | 58 | 59 | 60 | 61 | 62 | 63 | 64 |
| 5 | 65 | 66 | 67 | 68 | 69 | 70 | 71 | 72 | 73 | 74 | 75 | 76 | 77 |
| 6 | 78 | 79 | 80 | 81 | 82 | 83 | 84 | 85 | 86 | 87 | 88 | 89 | 90 |
| 7 | 91 | 92 | 93 | 94 | 95 | 96 | 97 | 98 | 99 |  |  |  |  |

RB index for UL transmission

↕ Different PHICH resouce

- Layer2

$I_l = 31$ ( $A^{(2)} = B^{(2)} = 1$   $C^{(2)} = D^{(2)} = 0$ ) For layer2

|  | PHICH group | | | | | | | | | | | | |
|---|---|---|---|---|---|---|---|---|---|---|---|---|---|
| Seq. index | 0 | 1 | 2 | 3 | 4 | 5 | 6 | 7 | 8 | 9 | 10 | 11 | 12 |
| 0 | 0 | 1 | 2 | 3 | 4 | 5 | 6 | 7 | 8 | 9 | 10 | 11 | 12 |
| 1 | 13 | 14 | 15 | 16 | 17 | 18 | 19 | 20 | 21 | 22 | 23 | 24 | 25 |
| 2 | 26 | 27 | 28 | 29 | (30) | (31) | 32 | 33 | 34 | 35 | 36 | 37 | 38 |
| 3 | 39 | 40 | 41 | 42 | 43 | 44 | 45 | 46 | 47 | 48 | 49 | 50 | 51 |
| 4 | 52 | 53 | 54 | 55 | 56 | 57 | 58 | 59 | 60 | 61 | 62 | 63 | 64 |
| 5 | 65 | 66 | 67 | 68 | 69 | 70 | 71 | 72 | 73 | 74 | 75 | 76 | 77 |
| 6 | 78 | 79 | 80 | 81 | 82 | 83 | 84 | 85 | 86 | 87 | 88 | 89 | 90 |
| 7 | 91 | 92 | 93 | 94 | 95 | 96 | 97 | 98 | 99 |  |  |  |  |

BASE STATION APPARATUS, MOBILE TERMINAL APPARATUS AND COMMUNICATION CONTROL METHOD

TECHNICAL FIELD

The present invention relates to a base station apparatus, a mobile terminal apparatus and a communication control method in a next-generation mobile communication system.

BACKGROUND ART

In a UMTS (Universal Mobile Telecommunications System) network, for the purposes of improving spectral efficiency and improving the data rates, system features based on W-CDMA (Wideband Code Division Multiple Access) are maximized by adopting HSDPA (High Speed Downlink Packet Access) and HSUPA (High Speed Uplink Packet Access). For this UMTS network, for the purposes of further increasing high-speed data rates, providing low delay and so on, long term evolution (LTE) has been under study (see, for example, Non Patent Literature 1). In LTE, as multiplexing schemes, OFDMA (Orthogonal Frequency Division Multiple Access), which is different from W-CDMA, is used on the downlink, and SC-FDMA (Single Carrier Frequency Division Multiple Access) is used on the uplink.

In a third-generation system, it is possible to achieve a transmission rate of maximum approximately 2 Mbps on the downlink by using a fixed band of approximately 5 MHz. Meanwhile, in the LTE system, it is possible to achieve a transmission rate of about maximum 300 Mbps on the downlink and about 75 Mbps on the uplink by using a variable band which ranges from 1.4 MHz to 20 MHz. Furthermore, in the UMTS network, for the purpose of achieving further broadbandization and higher speed, successor systems to LTE have been under study (for example, LTE Advanced (LTE-A)). Accordingly, in the future, it is expected that these multiple mobile communication systems will coexist, and configurations (radio base station apparatus, mobile terminal apparatus, etc.) that are capable of supporting these multiple systems will become necessary.

Also, in LTE-A, uplink single-user MIMO (Multiple Input Multiple Output) transmission is introduced to make possible improved uplink spectral efficiency. Consequently, in relationship to this introduction of uplink SU-MIMO, a resource allocation method for a response signal for retransmission of a signal in which a plurality of layers are space-multiplexed on the uplink, is under study.

CITATION LIST

Non-Patent Literature

Non-Patent Literature 1: 3GPP, TR25.912 (V7.1.0), "Feasibility study for Evolved UTRA and UTRAN," September 2006

SUMMARY OF INVENTION

Technical Problem

The present invention has been made in view of the above backgrounds, and it is therefore an object of the present invention to provide a base station apparatus, a mobile terminal apparatus and a communication control method that can adequately allocate resources of a response signal for retransmission of a signal in which a plurality of layers are space-multiplexed on the uplink.

Solution to Problem

A base station apparatus according to the present invention has a receiving section configured to receive spatially-multiplexed signals corresponding to a plurality of layers via an uplink, from a mobile terminal apparatus, a response signal generation section configured to generate response signals for retransmission, for transport blocks associated with the layers received on the uplink, and an allocation section configured to allocate the response signals for the transport blocks associated with the layers, to resources, by using offset values that are fixedly defined in advance between the base station apparatus and the mobile terminal apparatus for each of the transport blocks of the uplink.

Advantageous Effects of Invention

According to the present invention, it is possible to prevent collision of response signal resources that are allocated to transport blocks associated with respective layers, by using offsets that are defined in advance, on a fixed basis, with a mobile terminal apparatus, per transport block associated with an uplink layer. In this way, it is possible to adequately allocate, to a base station apparatus adopting uplink single-user MIMO transmission mode, response signal resources for uplink signal retransmission, per transport block associated with a layer.

BRIEF DESCRIPTION OF DRAWINGS

FIG. 3 is a diagram to explain an example of a PHICH resource allocation method of the LTE system using CS values;

FIG. 5 is a diagram to explain an example of a PHICH resource allocation method of the LTE system using CS values;

FIG. 6 is a diagram to explain an example of the first PHICH resource allocation method;

FIG. 7 is a diagram to explain an example of a second PHICH resource allocation method;

FIG. 9 is a diagram to explain an example of a fourth PHICH resource allocation method;

FIG. 15 is a diagram to explain an example of a fifth PHICH resource allocation method.

DESCRIPTION OF EMBODIMENTS

Figure 1:
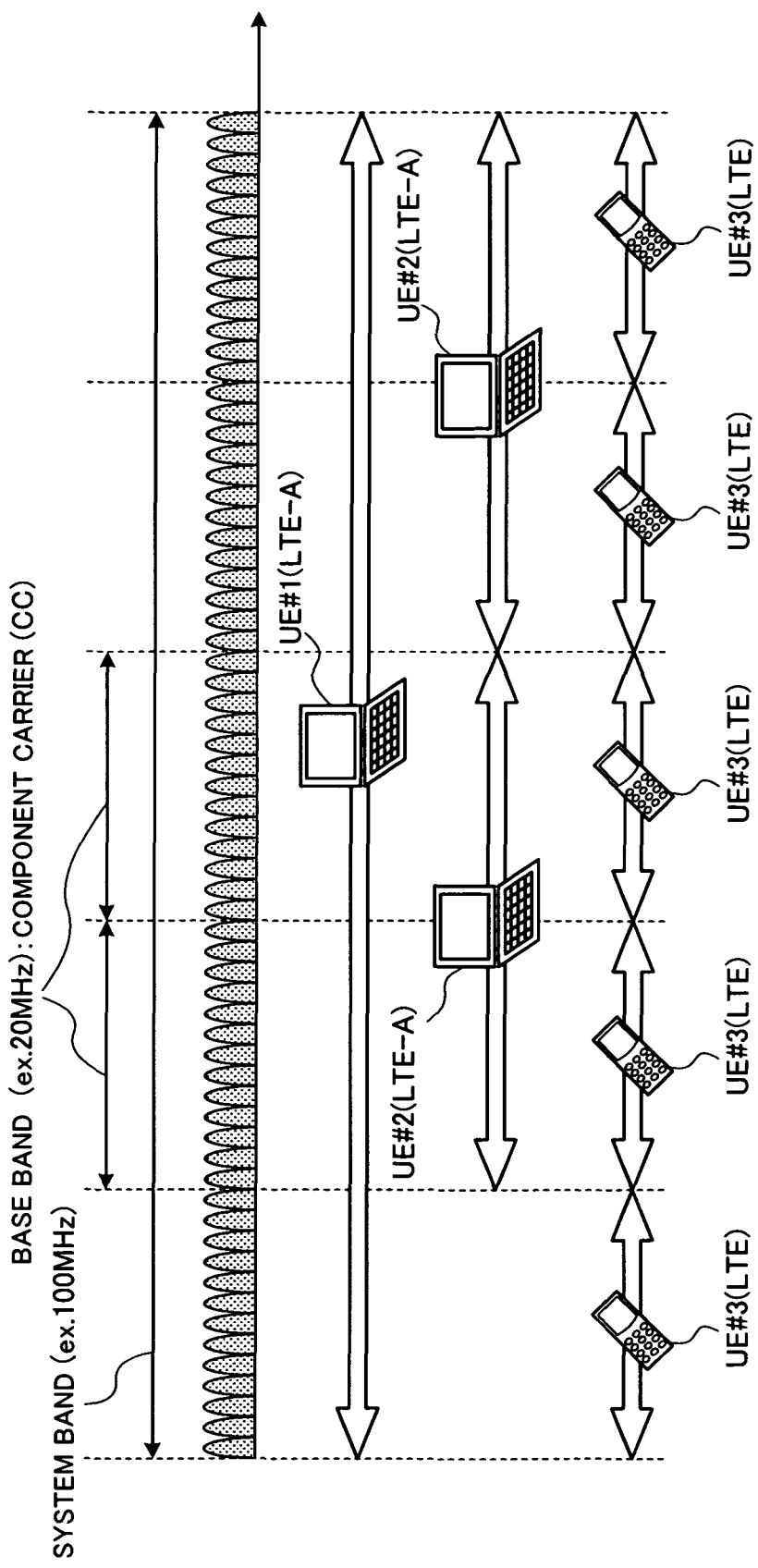
FIG. 1 is a diagram to explain the system band of an LTE-A system.

FIG. 1 is a diagram for explaining the state of use of frequency when mobile communication is performed on the downlink. The example illustrated in FIG. 1 is the state of use of frequency in the event where an LTE-A system, which is the first mobile communication system having a relatively wide first system band formed with a plurality of fundamental frequency blocks (hereinafter referred to as "component carriers: CCs"), and an LTE system, which is a second mobile communication system having a relatively narrow (here, formed with one component carrier) second system band, coexist. In the LTE-A system, for example, radio communication is performed using a variable system bandwidth of 100 MHz or below, and, in the LTE system, radio communication is performed using a variable system bandwidth of 20 MHz or below. The system band for the LTE-A system is at least one fundamental frequency block, where the system band of the LTE system is one unit. Coupling a plurality of fundamental frequency blocks into a wide band as one unit in this way is referred to as "carrier aggregation".

For example, in FIG. 1, the system band of the LTE-A system is a system band to include bands of five component carriers (20 MHz×5=100 MHz), where the system band (base band: 20 MHz) of the LTE system is one component carrier. In FIG. 1, mobile terminal apparatus UE (User Equipment) #1 is a mobile terminal apparatus to support the LTE-A system (and also support the LTE system) and has a system band of 100 MHz. UE #2 is a mobile terminal apparatus to support the LTE-A system (and also support the LTE system) and has a system band of 40 MHz (20 MHz×2=40 MHz). UE #3 is a mobile terminal apparatus to support the LTE system (and not support the LTE-A system) and has a system band of 20 MHz (base band).

Now, in the LTE system and LTE-A system, the base station apparatus transmits HARQ (Hybrid Automatic Repeat reQuest) ACK or NACK of uplink transmission (PUSCH: Physical Uplink Shared Channel) by the PHICH (Physical Hybrid-ARQ Indicator Channel). PHICH resources are specified based on, for example, the PHICH group and the seq. index, as shown in FIG. 2A. The PHICH groups are divided per predetermined frequency band. The seq. indices represent the orthogonal sequence indices to be used in the same frequency band (the same PHICH group). In this way, the PHICH is FDM (Frequency Division Multiplexing)-multiplexed between a plurality of PHICH groups and is CDM (Code Division Multiplexing)-multiplexed in the same PHICH group.

Figure 2:
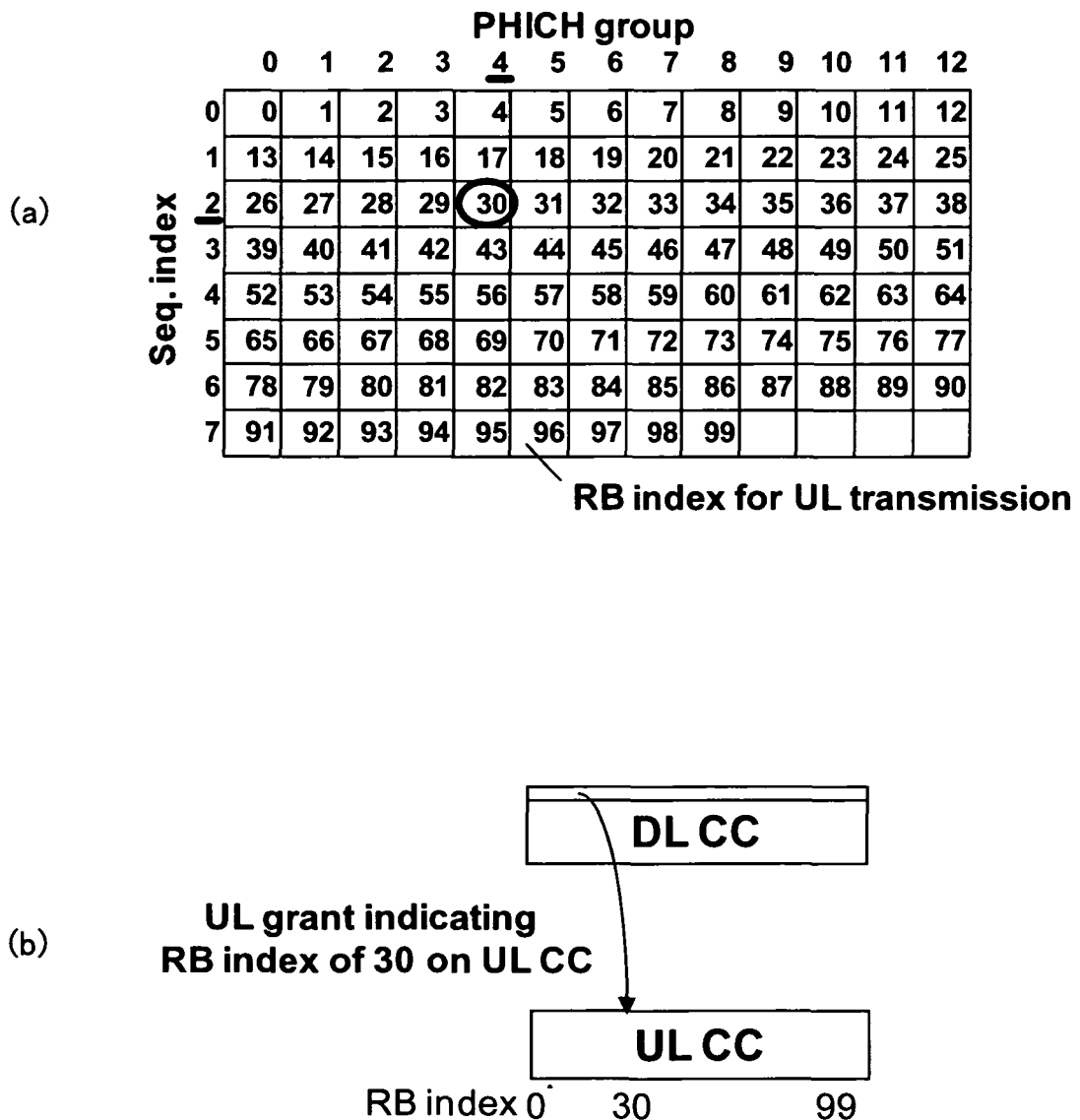
FIG. 2 provides diagrams each explaining an example of a PHICH resource allocation method of an LTE system.

In the LTE system, PHICH resources are allocated according to the resource block index (RB index) for uplink transmission, indicated to the mobile terminal apparatus in the UL grant. As shown in FIG. 2B, the uplink adopts single-carrier (SC-FDMA), so that the top resource block index (the lowest resource block index) $I_{low}$ of consecutive resource blocks is indicated in the UL grant. In the example shown in FIG. 2, when the lowest resource block index $I_{low}$ "30" for uplink transmission is indicated, the PHICH resource is allocated to the PHICH group "4", the seq. index "2". Note that, "DL CC" given in the following descriptions represents the downlink of a component carrier and "UL CC" represents the uplink of a component carrier.

Figure 3:
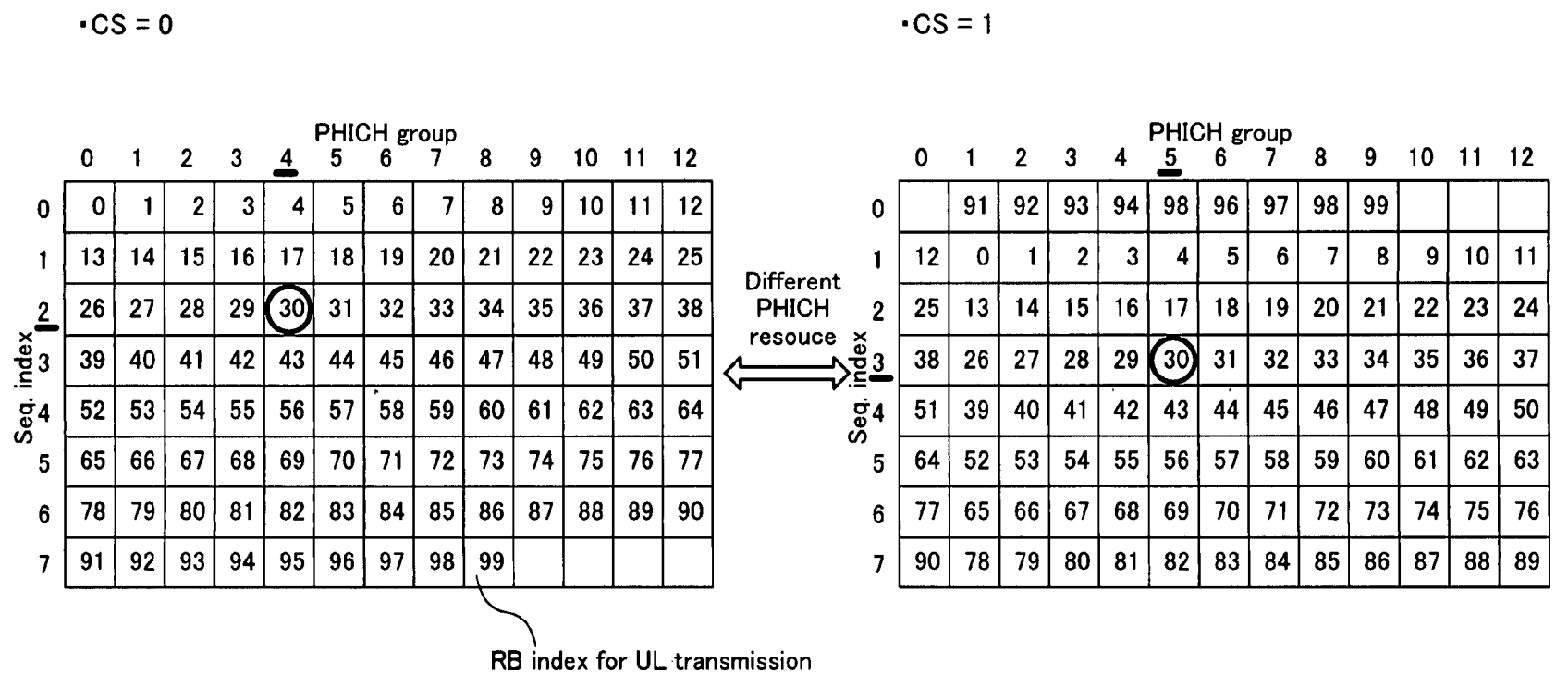

Also, in the LTE system, when a plurality of mobile terminal apparatuses use the same $I_{low}$ in multi-user MIMO (Multiple Input Multiple Output), the CS (Cyclic Shift) value, which is an uplink demodulation reference signal (DMRS) parameter, is used. As shown in FIG. 3, collision of PHICH resources is prevented by changing the CS values on a per-UE basis. In the example shown in FIG. 3, when a plurality of mobile terminal apparatuses use the same $I_{low}$ "30," the PHICH resource for one mobile terminal apparatus is, assuming the CS value "0", allocated to the PHICH group "4", the seq. index "2". Also, the PHICH resource for the other mobile terminal apparatus is, assuming the CS value "1", allocated to the PHICH group "5", the seq. index "3". In this way, in the LTE system, PHICH resources are allocated in accordance with the lowest resource block index $I_{low}$ for uplink transmission and CS values.

Figure 4:
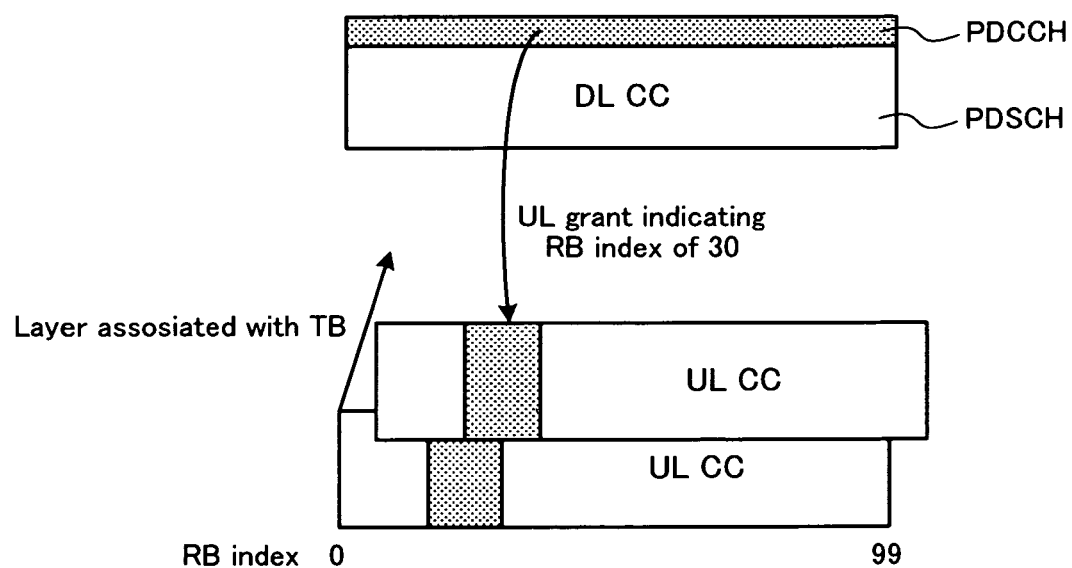
FIG. 4 is a diagram to explain uplink single-user MIMO of the LTE-A system.

On the other hand, on the uplink of the LTE-A system, as shown in FIG. 4, single-user MIMO to map maximum two transport blocks (TBs) to a plurality of layers and transmit signals by a plurality of antennas is employed. In single-user MIMO, an ACK or NACK is transmitted in association with two transport blocks, so that supporting two PHICHs is under study. Since the uplink transmission signals of respective layers are multiplexed in the same band, there is a problem that two PHICHs collide with each other if allocated based on the same $I_{low}$. Note that a transport block refers to the basic unit of processes to be executed in the physical layer, including coding, modulation/demodulation, HARQ and so on.

To solve the above problem, a method of preventing PHICH resources from colliding by selecting a different CS value for every transport block may be possible. To be more specific, the PHICH group and seq. index are determined using equation 1:

[Formula 1]

$$n_{PHICH}^{group} = (I_{PRB\_RA}^{lowest\_index} + n_{DMRS}) \bmod$$ (Equation 1)

PHICH group $N_{PHICH}^{group} + I_{PHICH} N_{PHICH}^{group}$

Seq. index $n_{PHICH}^{seq} = (\lfloor I_{PRB\_RA}^{lowest\_index} / N_{PHICH}^{group} \rfloor +$ $n_{DMRS}) \bmod 2N^{PHICH}$ $N_{PHICH}^{group}$: Number of PHICH groups
$N_{SF}^{PHICH}$: Spreading factor size
$n_{DMRS}$: Cyclic shift
$I_{PRB\_RA}^{lowest\_index}$: Lowest RB index in uplink RB allocation
$I_{PHICH}$: $I_{PHICH}$ =

$$\begin{cases} 1 \text{ for } TDD\ UL/DL \text{ configuration } 0 \\ \text{with } PUSCH \text{ transmission in subframe } n = 4 \text{ or } 9 \\ 0 \text{ otherwise} \end{cases}$$

Figure 5:
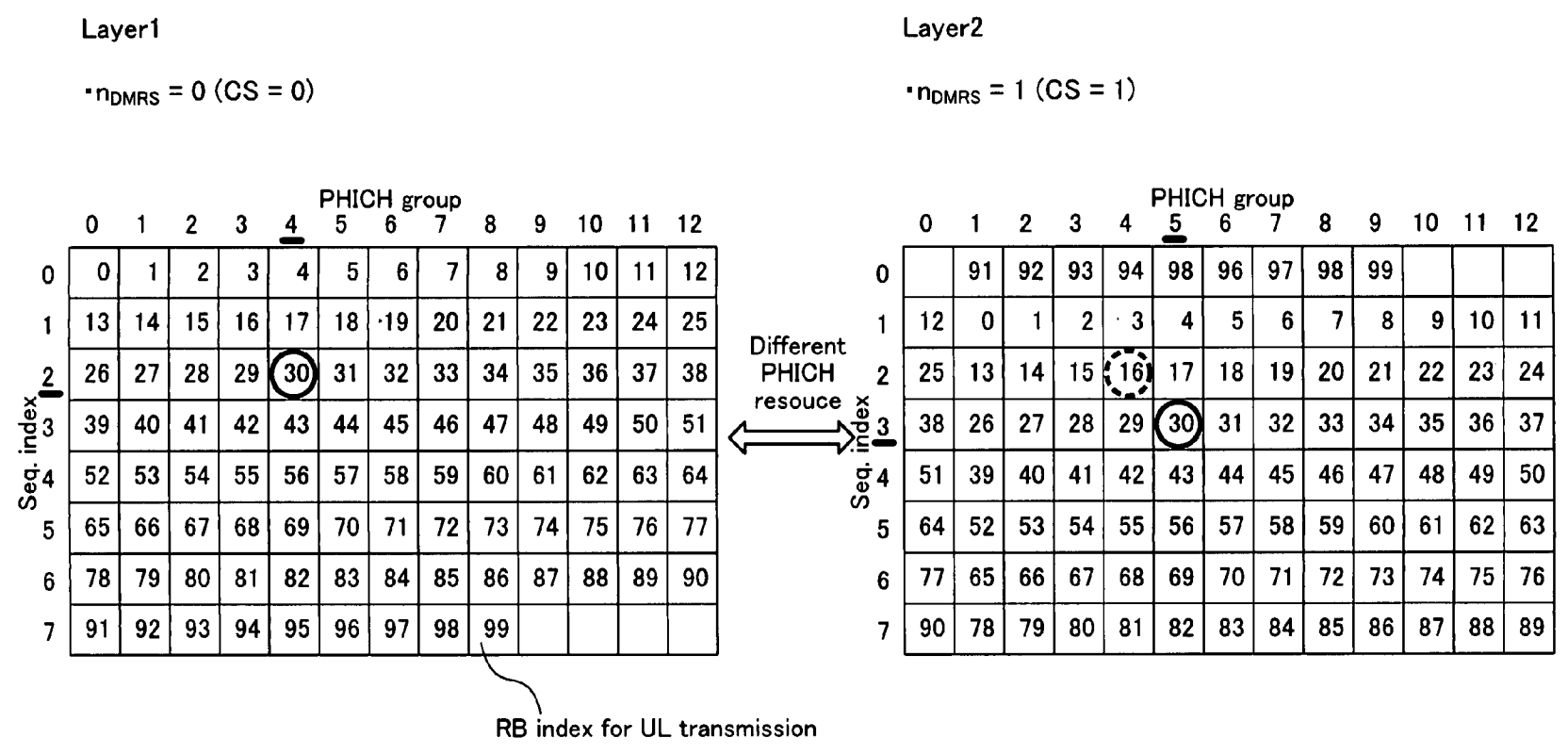

As shown in FIG. 5, when $I_{low}$ "30" is indicated on the uplink, by setting the CS value ($n_{DMRS}$) to "0," the PHICH resource for TB 1 is allocated to the PHICH group "4", the seq. index "2". On the other hand, the PHICH resource for TB 2 is, by setting the CS value ($n_{DMRS}$) to "1", allocated to the PHICH group "5", the seq. index "3". However, with the above method, it is necessary to report the CS values from the base station apparatus to the mobile terminal apparatus on a per-TB basis, and therefore there is a problem that the control signal overhead increases.

The present inventors have arrived at the present invention in order to solve this problem. That is to say, focusing on the fact that, in uplink single-user MIMO transmission mode in the LTE-A system, PHICH resources corresponding to respective transport blocks collide, an essence of the present invention is to determine the PHICH resources using offset values that are set in advance on a fixed basis in the system. By means of this configuration, it is possible to prevent collision of PHICH resources without increasing the control signal overhead.

Now, an embodiment of the present invention will be described below in detail with reference to the accompanying drawings. Referring to FIG. 6 to FIG. 9, a PHICH resource allocation method in single-user MIMO transmission mode will be described.

As described above, on the uplink in LTE-A, single-user MIMO to associate a plurality of transport blocks with a plurality of layers and transmit signals by a plurality of antennas, is employed. With the present embodiment, PHICH resources corresponding to each transport block (each layer) are determined using equation 2. Note that $A^{(l)}$ and $B^{(l)}$ in equation 2 represent the offset values to the lowest resource block index $I_{low}$. $C^{(l)}$ is the offset value to the seq. index. $D^{(l)}$ is the offset value to the PHICH group. $l$ represents the index corresponding to each uplink transport block (layer). Also, the offset values $A^{(l)}$, $B^{(l)}$, $C^{(l)}$ and $D^{(l)}$ are values defined in advance between the base station apparatus and the mobile terminal apparatus on a fixed basis.

[Formula 2]

$$n_{PHICH}^{group} = ((I_{PRB\_RA}^{lowest\_index} + A^{(1)}) + \quad \text{(Equation 2)}$$
$$\text{PHICH group} \quad n_{DMRS} + D^{(1)}) \bmod N_{PHICH}^{group} + I_{PHICH} N_{PHICH}^{group}$$
$$\text{Seq. index} \quad n_{PHICH}^{seq} = (\lfloor (I_{PRB\_RA}^{lowest\_index} + B^{(1)}) / N_{PHICH}^{group} \rfloor +$$
$$n_{DMRS} + C^{(1)}) \bmod 2N_{SF}^{PHICH}$$

$N_{PHICH}^{group}$: Number of PHICH groups
$N_{SF}^{PHICH}$: Spreading factor size
$n_{DMRS}$: Cyclic shift
$I_{PRB\_RA}^{lowest\_index}$: Lowest RB index in uplink RB allocation
$I_{PHICH}$: $I_{PHICH} =$
$\begin{cases} 1 \text{ for TDD UL/DL configuration 0 with} \\ \quad PUSCH \text{ transmission in subframe } n = 4 \text{ or } 9 \\ 0 \text{ otherwise} \end{cases}$ When equation 2 is used, varying offset values $A^{(l)}$, $B^{(l)}$, $C^{(l)}$ and $D^{(l)}$ are set for every uplink transport block (layer), so that collision of PHICH resources corresponding to respective transport blocks (layers) is prevented. Here, the first PHICH resource allocation method in single-user MIMO transmission mode will be described in detail. With the first PHICH resource allocation method, collision of PHICH resources is prevented by using varying offset values $C^{(l)}$ and $D^{(l)}$ for every uplink transport block (layer).

With the first PHICH resource allocation method, 0 is set in both offset values $A^{(l)}$ and $B^{(l)}$ in equation 2. Consequently, equation 2 can be modified into equation 3.

[Formula 3]

$$n_{PHICH}^{group} = (I_{PRB\_RA}^{lowest\_index} + n_{DMRS} + D^{(1)}) \bmod \quad \text{(Equation 3)}$$
$$\text{PHICH group} \quad N_{PHICH}^{group} + I_{PHICH} N_{PHICH}^{group}$$
$$\text{Seq. index} \quad n_{PHICH}^{seq} = (\lfloor I_{PRB\_RA}^{lowest\_index} / N_{PHICH}^{group} \rfloor +$$
$$n_{DMRS} + C^{(1)}) \bmod 2N_{SF}^{PHICH}$$

$N_{PHICH}^{group}$: Number of PHICH groups
$N_{SF}^{PHICH}$: Spreading factor size
$n_{DMRS}$: Cyclic shift
$I_{PRB\_RA}^{lowest\_index}$: Lowest RB index in uplink RB allocation
$I_{PHICH}$: $I_{PHICH} =$
$\begin{cases} 1 \text{ for TDD UL/DL configuration 0 with} \\ \quad PUSCH \text{ transmission in subframe } n = 4 \text{ or } 9 \\ 0 \text{ otherwise} \end{cases}$ Collision of PHICH resources corresponding to respective transport blocks (layers) is prevented by setting varying offset values $C^{(l)}$ and $D^{(l)}$ in equation 3 for every transport block (layer). In this case, the offset value $C^{(l)}$ moves the PHICH resources in the seq. index direction, and the offset value $D^{(l)}$ moves the PHICH resources in the PHICH group direction.

Figure 6:
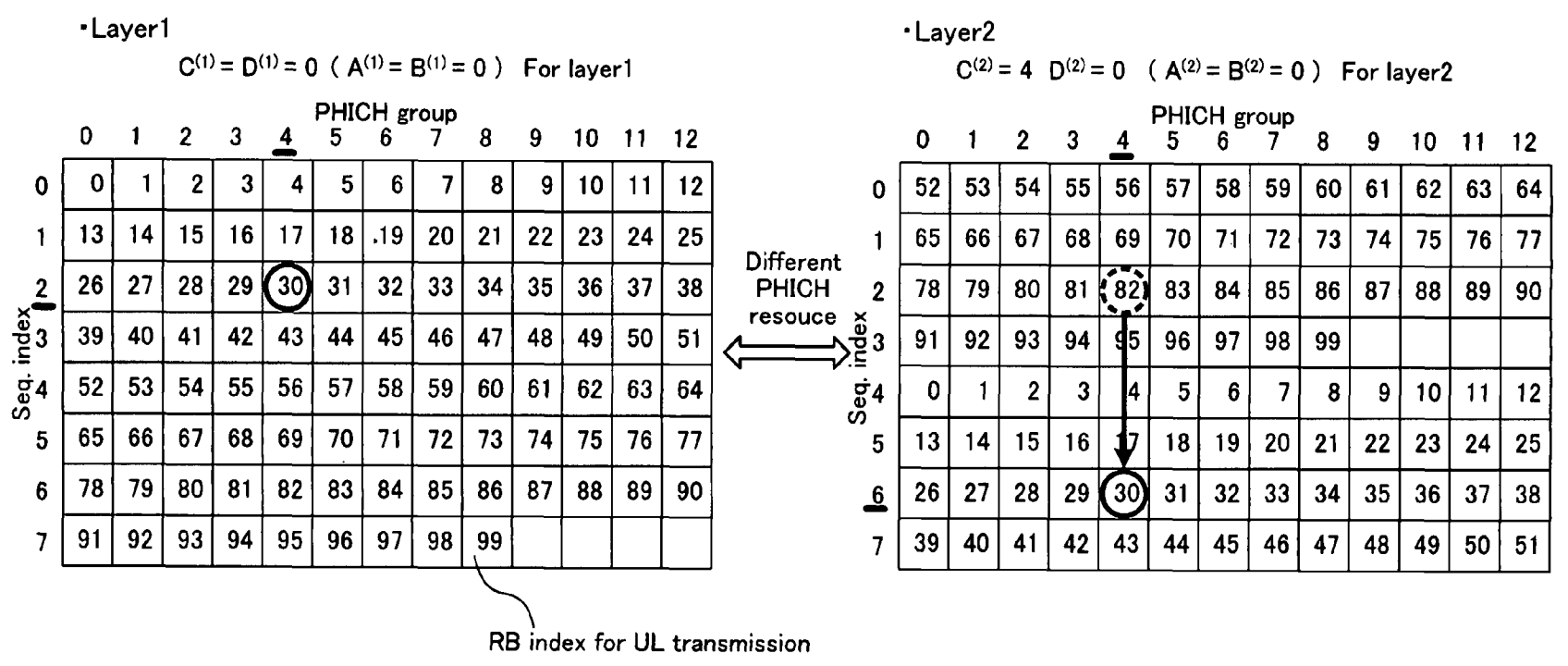

FIG. 6 shows a case where "0" is set in both offset values $C^{(1)}$ and $D^{(1)}$ for TB 1, and where "4" is set in the offset value $C^{(2)}$ and "0" is set in $D^{(2)}$ for TB 2. When $I_{low}$ "30" is indicated on the uplink by the UL grant, the PHICH resource for TB 1 is allocated to the PHICH group "4," the seq. index "2." Meanwhile, the PHICH resource for TB 2 is allocated to the PHICH group "4," the seq. index "6." That is to say, by the offset value $C^{(2)}$, the PHICH resource for TB 2 is set four resources apart in the seq. index direction from the PHICH resource for TB 1. In this way, PHICH resources for TBs 1 and 2 are prevented from colliding by using the offset values $C^{(l)}$ and $D^{(l)}$ for the seq. index and PHICH group.

Also, the offset values $C^{(l)}$ and $D^{(l)}$ are values defined in advance between the base station apparatus and the mobile terminal apparatus on a fixed basis. Consequently, it is not necessary to report the offset values $C^{(l)}$ and $D^{(l)}$ from the base station apparatus to the mobile terminal apparatus, and it is therefore not necessary to increase the control signal overhead. Note that, although the first PHICH resource allocation method is configured to set fixed values for the offset values $C^{(l)}$ and $D^{(l)}$ in equation 3 for every transport block (layer), it is equally possible to configure a method to set "0" in the offset values $A^{(l)}$ and $B^{(l)}$ in equation 2 for every transport block (layer) and set fixed values in $C^{(l)}$ and $D^{(l)}$. For example, in FIG. 6, the offset values $A^{(1)}$ and $B^{(1)}$, $C^{(1)}$ and $D^{(1)}$ for TB 1 are set to "0," the offset values $A^{(2)}$ and $B^{(2)}$ and $D^{(2)}$ for TB 2 are set to "0," and the offset value $C^{(2)}$ is set to "4." Also, although the offset values $C^{(l)}$ and $D^{(l)}$ are given as values that are defined in advance between the base station apparatus and the mobile terminal apparatus on a fixed basis, it is equally possible to provide a configuration to report the offset values $C^{(l)}$ and $D^{(l)}$ from the base station apparatus to the mobile terminal apparatus by RRC signaling.

Next, a second PHICH resource allocation method in single-user MIMO transmission mode will be described in detail. With the second PHICH resource allocation method, collision of PHICH resources is prevented by selecting varying resource block indices for every transport block (layer) from among the resource blocks allocated for uplink transmission.

With the second PHICH resource allocation method, "0" is set in both offset values $C^{(l)}$ and $D^{(l)}$ of equation 2. Consequently, when the uplink is space-multiplexed by two layers, equation 2 can be modified into equation 4 and equation 5. Note that $I_1$ in equation 4 represents the resource block index selected for TB 1, and $I_2$ represents the resource block index selected for TB 2. $I_1$ is selected as an offset value $A^{(l)}$ is applied to the lowest resource block index $I_{low}$. $I_2$ is selected as an offset value $B^{(l)}$ is applied to the lowest resource block index $I_{low}$.

[Formula 4]

$$\text{For TB 1} \quad n_{PHICH}^{group} = (I_1 + n_{DMRS}) \bmod \quad \text{(Equation 4)}$$
$$\text{PHICH group} \quad N_{PHICH}^{group} + I_{PHICH} N_{PHICH}^{group}$$
$$\text{Seq. index} \quad n_{PHICH}^{seq} = (\lfloor I_1 / N_{PHICH}^{group} \rfloor +$$
$$n_{DMRS}) \bmod 2N_{SF}^{PHICH}$$

-continued

For TB 2
PHICH group
Seq. index $$n_{PHICH}^{group} = (I_2 + n_{DMRS}) \bmod N_{PHICH}^{group} + I_{PHICH} N_{PHICH}^{group}$$ (Equation 5)

$$n_{PHICH}^{seq} = (\lfloor I_2 / N_{PHICH}^{group} \rfloor + n_{DMRS}) \bmod 2N_{SF}^{PHICH}$$

$N_{PHICH}^{group}$: Number of PHICH groups $N_{SF}^{PHICH}$: Spreading factor size $n_{DMRS}$: Cyclic shift $I_{PRB\_RA}^{lowest\_index}$: Lowest RB index in uplink RB allocation $I_{PHICH}$: $I_{PHICH} =$
$\begin{cases} 1 \text{ for TDD UL/DL configuration 0 with} \\ \quad PUSCH \text{ transmission in subframe } n = 4 \text{ or } 9 \\ 0 \text{ otherwise} \end{cases}$ $I_1$: $I_1 = I_{PRB\_RA}^{lowest\_index} + A^{(1)}$ $I_2$: $I_2 = I_{PRB\_RA}^{lowest\_index} + B^{(2)}$ PHICH resources corresponding to respective transport blocks (layers) are prevented from colliding by selecting varying resource block indices I₁ and I₂ for every transport block (layer) in equation 4 and equation 5. In this case, the offset values A⁽ⁱ⁾ and B⁽ⁱ⁾ move the PHICH resources in the direction in which the consecutive resource block indices are aligned.

FIG. 7 shows an example where "0" is set in both offset values A⁽¹⁾ and B⁽¹⁾ for TB 1 and where "1" is set in both offset values A⁽²⁾ and B⁽²⁾ for TB 2. When the lowest resource block index I_low "30" is indicated by the UL grant, the PHICH resource for TB 1 is allocated to the PHICH group "4", the seq. index "2," in association with the resource block index "30". On the other hand, the PHICH resource for TB 2 is allocated to the PHICH group "5", the seq. index "2", in association with the resource block index I₂ "31". That is to say, the PHICH resource for TB 1 is allocated in association with the lowest resource block index, and the PHICH resource for TB 2 is allocated in association with the second lowest resource block index, which neighbors the lowest resource block index. In this way, by selecting varying resource block indices for every transport block (layer) from the resource block indices allocated for uplink transmission, PHICH resources for TBs 1 and 2 are prevented from colliding.

Also, the offset values A⁽ⁱ⁾ and B⁽ⁱ⁾ are values defined in advance between the base station apparatus and the mobile terminal apparatus on a fixed basis. Consequently, it is not necessary to report the offset values A⁽ⁱ⁾ and B⁽ⁱ⁾ from the base station apparatus to the mobile terminal apparatus, and therefore it is possible to reduce the control signal overhead. Note that, although the second PHICH resource allocation method is configured to set fixed values for the offset values A⁽ⁱ⁾ and B⁽ⁱ⁾ in equation 4 and equation 5 for every transport block (layer), it is equally possible to configure a method to set fixed values in the offset values A⁽ⁱ⁾ and B⁽ⁱ⁾ in equation 2 and set "0" in C⁽ⁱ⁾ and D⁽ⁱ⁾. For example, in FIG. 7, the offset values A⁽¹⁾, B⁽¹⁾, C⁽¹⁾ and D⁽¹⁾ for TB 1 are set to "0", the offset values A⁽²⁾ and B⁽²⁾ for TB 2 are set to "1", and the offset values C⁽²⁾ and D⁽²⁾ are set to "0."

Also, although FIG. 7 shows a configuration in which PHICH resources for TBs 1 and 2 are allocated in association with neighboring resource block indices, this configuration is by no means limiting. PHICH resources for TBs 1 and 2 have only to be allocated in association with the resource block indices of resource blocks allocated for uplink transmission, and may be, for example, allocated in association with an intermediate index "35," the last index "39," and so on. Also, although the offset values A⁽ⁱ⁾ and B⁽ⁱ⁾ are given as values that are defined in advance between the base station apparatus and the mobile terminal apparatus on a fixed basis, it is equally possible to provide a configuration to report the offset values A⁽ⁱ⁾ and B⁽ⁱ⁾ from the base station apparatus to the mobile terminal apparatus by RRC signaling.

Next, a third PHICH resource allocation method in single-user MIMO transmission mode will be described in detail. The third PHICH resource allocation method prevents collision of PHICH resources by selecting resource block indices of varying clusters for every transport block (layer), from among clustered allocation resource blocks. Note that a case will be described here where, for ease of explanation, the uplink is space-multiplexed by two layers.

As shown in FIG. 8A, a multi-access scheme (clustered DFT-S-OFDMA) to cluster consecutive allocation resource blocks is employed on the uplink of the LTE-A system. On the uplink of the LTE-A system, by clustering consecutive allocation resource blocks by means of this multi-access scheme, allocation on a spot basis is made possible, and therefore the efficiency of use of the system band is improved The base station apparatus, for example, indicates each cluster's lowest resource block index I_low to the mobile terminal apparatus in the UL grant. In FIG. 8A, "30" is indicated as I_low of the first cluster, and "60" is indicated as I_low of a second cluster.

PHICH resources corresponding to respective transport blocks (layers) are prevented from colliding by selecting the resource block indices I₁ and I₂ of varying clusters for every transport block (layer) in above equation 4 and equation 5. In this case, the offset values A⁽ⁱ⁾ and B⁽ⁱ⁾ move the PHICH resources of each transport block (layer) to correspond to resource block indices of varying clusters.

FIG. 8B shows an example where "0" is set in both offset values A⁽¹⁾ and B⁽¹⁾ for TB 1 and "30" is set in both offset values A⁽²⁾ and B⁽²⁾ for TB 2. When the lowest resource block index I_low "30" is indicated by the UL grant, the PHICH resource for TB 1 is allocated to the PHICH group "4", the seq. index "2", in association with the resource block index I₁ "30". On the other hand, the PHICH resource for TB 2 is allocated to the PHICH group "8", the seq. index "4", in association with the resource block index I₂ "60". That is to say, the PHICH resource for TB 1 is allocated in association with the lowest resource block index of the first cluster, and the PHICH resource for TB 2 is allocated in association with the lowest resource block index of the second cluster. In this way, the PHICH resources for TBs 1 and 2 are prevented from colliding by selecting resource block indices of varying clusters for every transport block (layer).

Also, the offset values A⁽ⁱ⁾ and B⁽ⁱ⁾ are values defied in advance between the base station apparatus and the mobile terminal apparatus on a fixed basis. Consequently, it is not necessary to report the offset values A⁽ⁱ⁾ and B⁽ⁱ⁾ from the base station apparatus to the mobile terminal apparatus, and therefore it is possible to reduce the control signal overhead. Note that, although the third PHICH resource allocation method is configured to set fixed values for the offset values A⁽ⁱ⁾ and B⁽ⁱ⁾ in equation 4 and equation 5 for every transport block (layer), it is equally possible to configure a method to set fixed values in the offset values A⁽ⁱ⁾ and B⁽ⁱ⁾ in equation 2 and set "0" in C⁽ⁱ⁾ and D⁽ⁱ⁾. For example, in FIG. 8, the offset values A⁽¹⁾, B⁽¹⁾, C⁽¹⁾ and D⁽¹⁾ for TB 1 are set to "0," the offset values A⁽²⁾ and B⁽²⁾ for TB 2 are set to "30," and the offset values C⁽²⁾ and D⁽²⁾ are set to "0."

Figure 8:
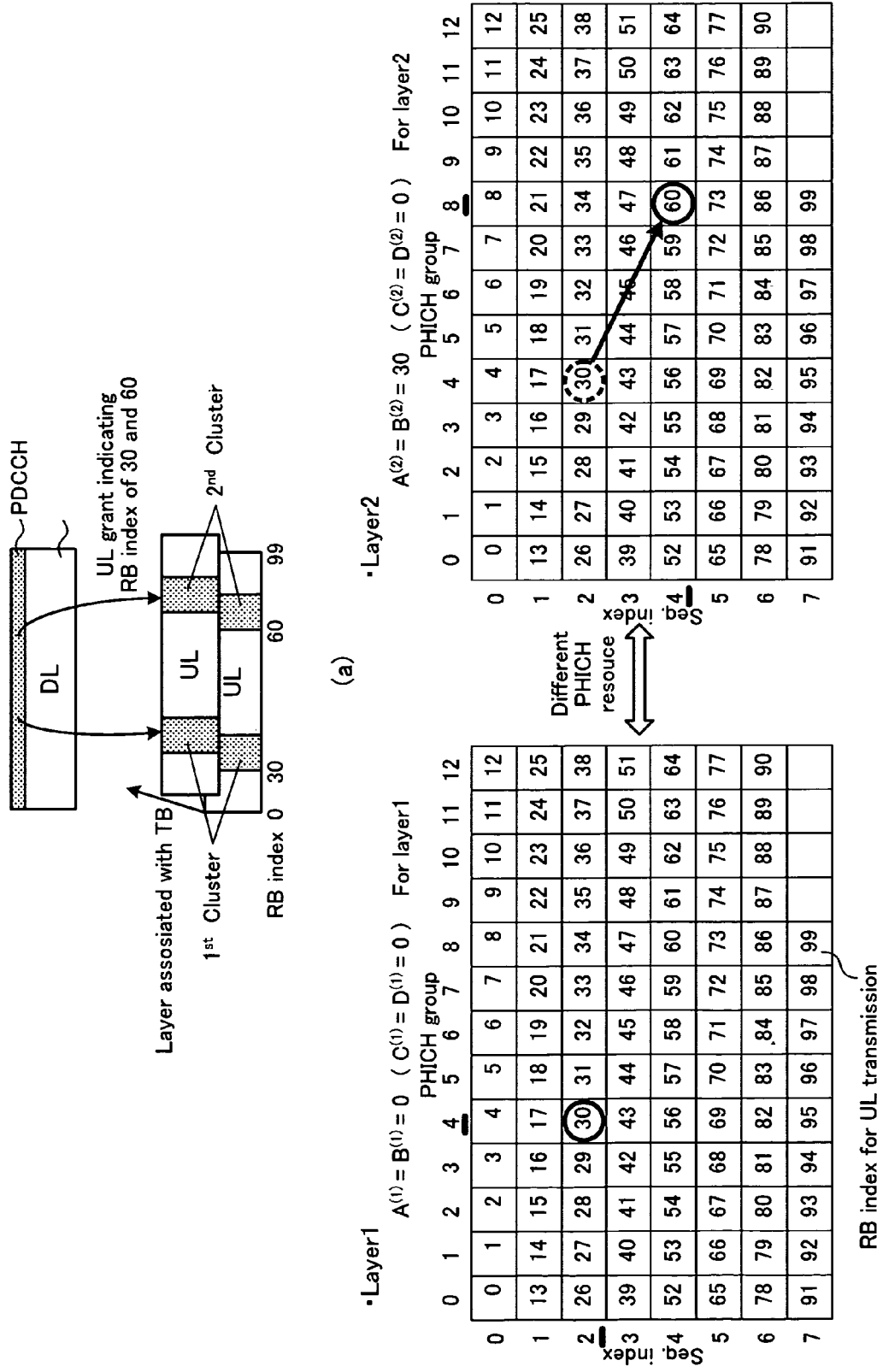
FIG. 8 provides diagrams to explain clustered DFT-S-OFDMA of the LTE-A system.

Also, although FIG. 8 shows a configuration to allocate PHICH resources for TBs 1 and 2 in association with the lowest resource block index of each cluster, this configuration is by no means limiting. PHICH resources for TBs 1 and 2 have only to be allocated in association with resource block indices used in varying clusters, for every transport block (layer), and may be, for example, allocated in association with an intermediate index, the final index and so on. Also, although the offset values $A^{(l)}$ and $B^{(l)}$ are given as values that are defined in advance between the base station apparatus and the mobile terminal apparatus on a fixed basis, it is equally possible to provide a configuration to report the offset values $A^{(l)}$ and $B^{(l)}$ from the base station apparatus to the mobile terminal apparatus by RRC signaling.

Note that as the offset values $A^{(l)}$ and $B^{(l)}$ are the same values in equation 2 to equation 5 described above, it is equally possible to make the offset value $A^{(l)}=B^{(l)}$. Also, it is equally possible to use the above-described first to third PHICH resource allocation methods in adequate combinations by modifying equation 2.

Next, a fourth PHICH resource allocation method in single-user MIMO transmission mode will be described in detail. The fourth PHICH resource allocation method prevents collision of PHICH resources by selecting resource block indices of varying clusters for every transport block (layer), from among clustered allocation resource blocks. Note that, a case will be described here, for ease of explanation, where the uplink is space-multiplexed by two layers.

As described above, a multi-access scheme (clustered DFT-S-OFDMA) to cluster consecutive allocation resource blocks is employed on the uplink in LTE-A. According to the fourth PHICH resource allocation method, PHICH resources corresponding to respective transport blocks (layers) are determined using equation 6 and equation 7. Note that $I_3$ in equation 6 represents the resource block index of the cluster selected for TB 1, and $I_4$ in equation 7 represents the resource block index of the cluster selected for TB 2. $C^{(l)}$ represents the offset value to the seq. index. $D^{(l)}$ represents the offset value to the PHICH group.

[Formula 5]

For TB 1
PHICH group
Seq. index $$n^{group}_{PHICH} = (I_3 + n_{DMRS} + D^{(1)}) \bmod N^{group}_{PHICH} + I_{PHICH} N^{group}_{PHICH}$$
$$n^{seq}_{PHICH} = (\lfloor I_3 / N^{group}_{PHICH} \rfloor + n_{DMRS} + C^{(1)}) \bmod 2N^{PHICH}_{SF}$$

(Equation 6)

For TB 2
PHICH group
Seq. index $$n^{group}_{PHICH} = (I_4 + n_{DMRS} + D^{(2)}) \bmod N^{group}_{PHICH} + I_{PHICH} N^{group}_{PHICH}$$
$$n^{seq}_{PHICH} = (\lfloor I_4 / N^{group}_{PHICH} \rfloor + n_{DMRS} + C^{(2)}) \bmod 2N^{PHICH}_{SF}$$

(Equation 7)

$N^{group}_{PHICH}$: Number of PHICH groups
$N^{PHICH}_{SF}$: Spreading factor size
$n_{DMRS}$: Cyclic shift
$I^{lowest\_index}_{PRB\_RA}$: Lowest RB index in uplink RB allocation
$I_{PHICH}$: $I_{PHICH} =$
$\begin{cases} 1 \text{ for } TDD \ UL/DL \text{ configuration 0 with} \\ \quad PUSCH \text{ transmission in subframe } n = 4 \text{ or } 9 \\ 0 \text{ otherwise} \end{cases}$ $I_3$: $I_3 =$ RB index for the first cluster
$I_4$: $I_4 =$ RB index for the second cluster PHICH resources corresponding to respective transport blocks (layers) are prevented from colliding by selecting the resource block indices $I_3$ and $I_4$ of varying clusters for every transport block (layer) in above equation 6 and equation 7. Resource block indices to be selected have only to be resource block indices used in varying clusters, for every transport block (layer), and may be, for example, an intermediate index, the final index and so on.

Figure 9:
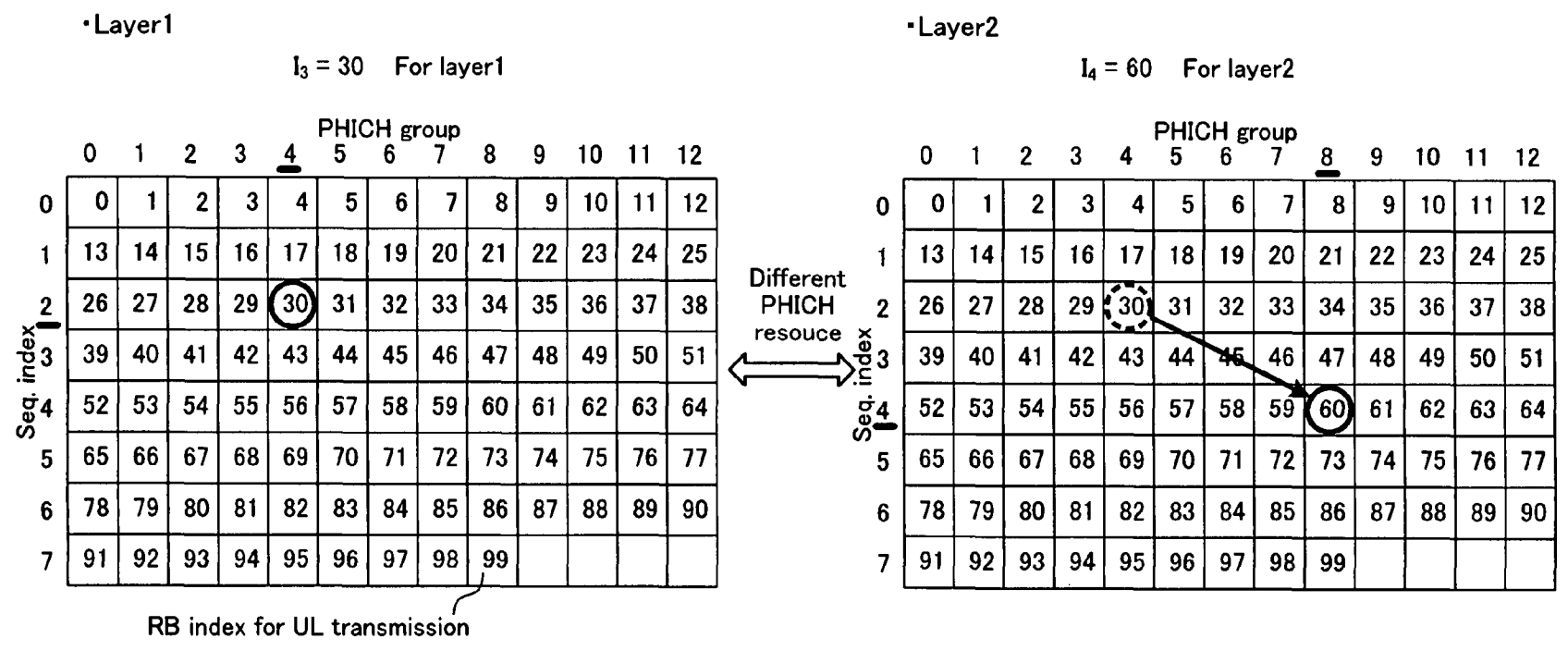

FIG. 9 shows an example where the resource block index $I_3$ "30" is set for TB 1 and the resource block index $I_4$ "60" is set for TB 2. Consequently, the PHICH resource for TB 1 is allocated to the PHICH group "4", the seq. index in association with the resource block index $I_3$ "30". On the other hand, the PHICH resource for TB 2 is allocated to the PHICH group "8", the seq. index "4", in association with the resource block index $I_4$ "60". That is to say, the PHICH resource for TB 1 is allocated in association with the lowest resource block index of the first cluster, and the PHICH resource for TB 2 is allocated in association with the lowest resource block index of the second cluster. In this way, the PHICH resources for TBs 1 and 2 are prevented from colliding by selecting resource block indices of varying clusters for every transport block (layer).

Next, a fifth PHICH resource allocation method in single-user MIMO transmission mode will be described in detail. The fifth PHICH resource allocation method prevents collision of PHICH resources by making the CS value ($n_{DMRS}$) different every uplink transport block (layer). Note that, a case will be described here, for ease of explanation, where the uplink is space-multiplexed by two layers.

PHICH resources corresponding to respective transport blocks are prevented from colliding by varying the CS value for every transport block (layer) based on offset values $C^{(l)}$ and $D^{(l)}$ that vary every transport block (layer) in above equation 3. That is to say, with the fifth PHICH resource allocation method, the offset values $C^{(l)}$ and $D^{(l)}$ function as values to offset the CS value that is common between TBs 1 and 2.

Figure 15:
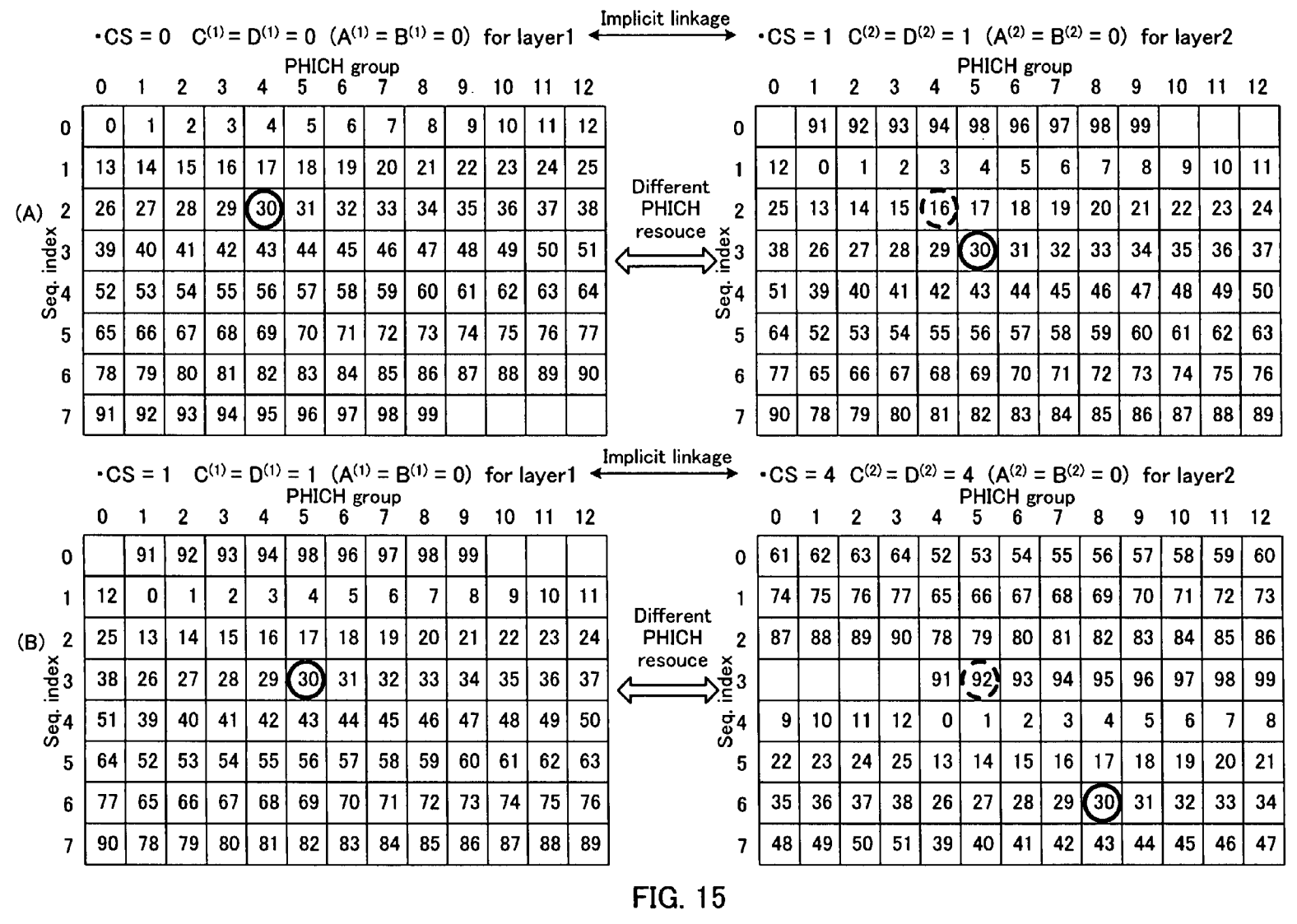

FIG. 15A shows an example where "0" is set in the offset values $C^{(1)}$ and $D^{(1)}$ for TB 1, "1" is set in the offset values $C^{(2)}$ and $D^{(2)}$ for TB 2, and "0" is set for the CS value that is common between TBs 1 and 2. When $I_{low}$ "30" is indicated on the uplink by the UL grant, assuming the CS value "0", the PHICH resource for TB 1 is allocated to the PHICH group "4", the seq. index "2". Meanwhile, the PHICH resource for TB 2 is, assuming the CS value "1", allocated to the PHICH group "5", the seq. index "3". That is to say, by the offset values $C^{(l)}$ and $D^{(l)}$, the PHICH resource for TB 2 is set the CS value "1" apart from the PHICH resource for TB 1. In this way, the PHICH resources for TBs 1 and 2 are prevented from colliding using the offset values $C^{(l)}$ and $D^{(l)}$ to the CS value that is common between TBs 1 and 2.

In this way, the CS value for each TB is implicitly linked by offset values $C^{(1)}$ and $D^{(1)}$. In this case, it is possible to make the offset values $C^{(2)}$ and $D^{(2)}$ for TB 2 variable depending on the size of the offset values $C^{(1)}$ and $D^{(1)}$ for TB 1. For example, in FIG. 15A, when the CS value "0" ($C^{(1)}$ and $D^{(1)}=0$) for TB 1 is set, the CS value "1" ($C^{(1)}$ and $D^{(1)}=1$) for TB 2 is set. Also, in FIG. 15B, when the CS value "1" ($C^{(1)}$ and $D^{(1)}=1$) for TB 1 is set, the CS value "4" ($C^{(2)}$ and $D^{(2)}=4$) for TB 2 is set. By means of this configuration, it is not necessary to report the CS value for TB 2 from the base station apparatus to the mobile terminal apparatus, and it is therefore not necessary to increase the control signal overhead.

Also, the offset values $C^{(l)}$ and $D^{(l)}$ are values defined in advance between the base station apparatus and the mobile terminal apparatus on a fixed basis. Consequently, it is not necessary to report the offset values $C^{(l)}$ and $D^{(l)}$ from the base station apparatus to the mobile terminal apparatus, and it is therefore not necessary to increase the control signal overhead. Note that, although the fifth PHICH resource allocation method is configured to set fixed values for the offset values $C^{(l)}$ and $D^{(l)}$ in equation 3 for every transport block (layer), it is equally possible to configure a method to set "0" in the offset values $A^{(l)}$ and $B^{(l)}$ in equation 2 for every transport block (layer) and set fixed values in $C^{(l)}$ and $D^{(l)}$. For example, in FIG. 15A, the offset values $A^{(1)}$, $B^{(1)}$, $C^{(1)}$ and $D^{(1)}$ for TB 1 are set to "0," the offset values $A^{(2)}$ and $B^{(2)}$ for TB 2 are set to "0," and the offset values $C^{(2)}$ and $D^{(2)}$ are set to "4." Also, although the offset values $C^{(l)}$ and $D^{(l)}$ are given as values that are defined in advance between the base station apparatus and the mobile terminal apparatus on a fixed basis, it is equally possible to provide a configuration to report the offset values $C^{(l)}$ and $D^{(l)}$ from the base station apparatus to the mobile terminal apparatus by RRC signaling.

Figure 10:
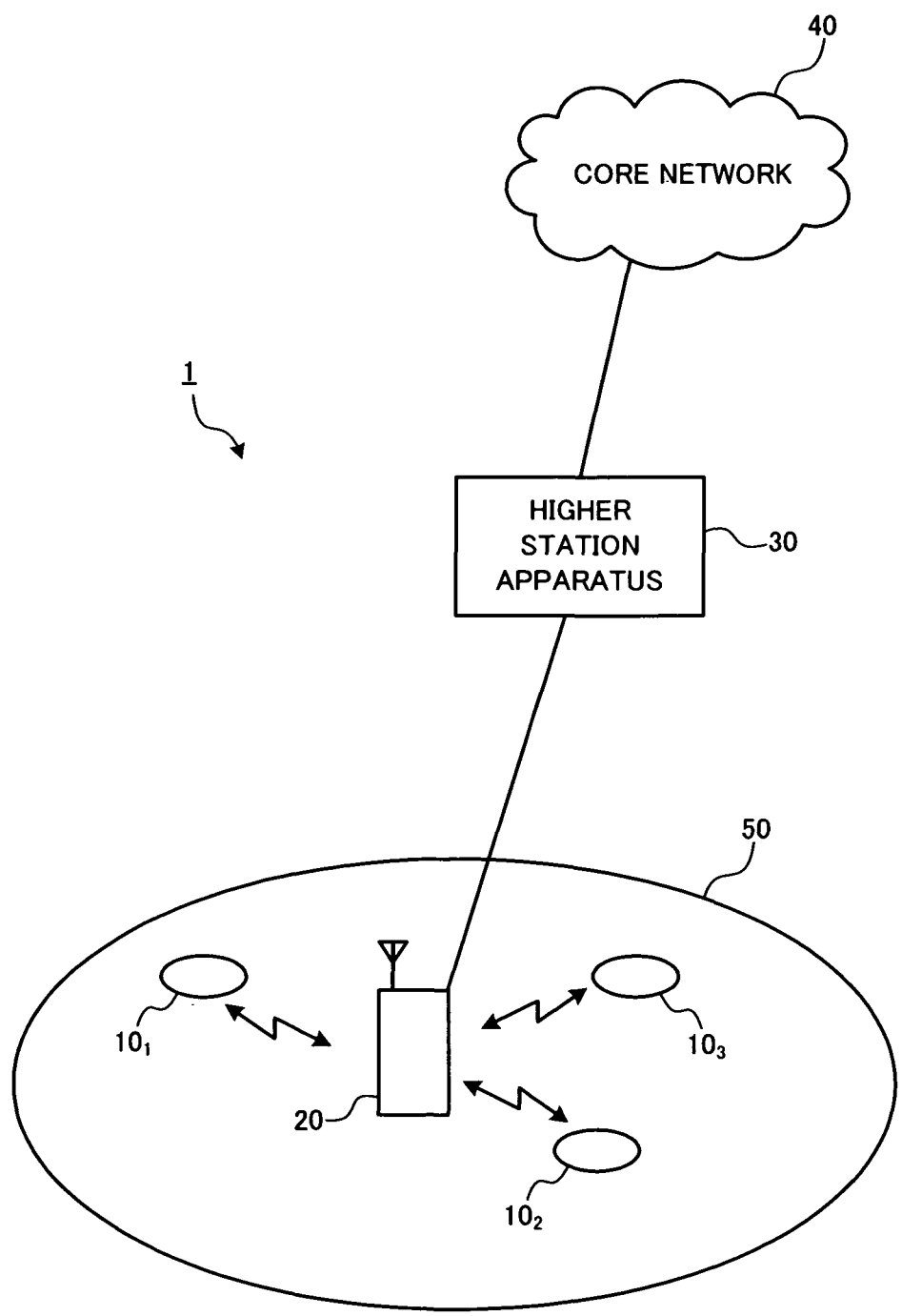
FIG. 10 is a diagram to explain a configuration of a mobile communication system.

Referring to FIG. 10, a radio communication system 1 having a mobile terminal apparatus (UE) 10 and a base station apparatus (Node B) 20 according to an embodiment of the present invention will be described. Here, a case will be described where a base station apparatus and a mobile station apparatus to support the LTE-A system are used. FIG. 10 is a diagram for explaining a configuration of the radio communication system 1 having mobile terminal apparatuses 10 and a base station apparatus 20 according to the present embodiment. Note that the radio communication system 1 illustrated in FIG. 10 is a system to accommodate, for example, the LTE system or SUPER 3G. Also, this radio communication system 1 may be referred to as IMT-Advanced or may be referred to as 4G.

As illustrated in FIG. 10, the radio communication system 1 is configured to include the base station apparatus 20 and a plurality of mobile terminal apparatuses 10 ($10_1$, $10_2$, $10_3$, . . . $10_n$, where n is an integer to satisfy n>0) that communicate with this base station apparatus 20. The base station apparatus 20 is connected with a higher station apparatus 30, and this higher station apparatus 30 is connected with a core network 40. The mobile terminal apparatuses 10 communicate with the base station apparatus 20 in a cell 50. The higher station apparatus 30 includes, for example, an access gateway apparatus, a radio network controller (RNC), a mobility management entity (MME) and so on, but is by no means limited to these.

The mobile terminal apparatuses ($10_2$, $10_2$, $10_3$, . . . $10_n$) have the same configuration, functions and state, so that the following descriptions will be given with respect to "mobile terminal apparatus 10," unless specified otherwise. Also, although the mobile terminal apparatus 10 performs radio communication with the base station apparatus 20 for ease of explanation, more generally, user apparatuses (UE: User Equipment) including mobile terminal apparatuses and fixed terminal apparatuses may be used.

In the radio communication system 1, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Here, the communication channels in the LTE system will be described. The downlink communication channels include the PDSCH (Physical downlink Shared Channel), which is a downlink data channel used by each mobile terminal apparatus 10 on a shared basis, and downlink L1/L2 control channels (including the PDCCH, PCFICH and PHICH). This PDSCH transmits user data and higher control signals. Scheduling information for the PDSCH and PUSCH and so on is transmitted by the PDCCH. The number of OFDM symbols to use for the PDCCH is transmitted by the PCFICH (Physical Control Format Indicator Channel). HARQ ACK/NACK for the PUSCH is transmitted by the PHICH. The higher control information includes RRC signaling, which reports the offset values to the mobile terminal apparatus 10.

The uplink communication channels include a PUSCH, which is an uplink data channel used by each mobile terminal apparatus 10 on a shared basis, and a PUCCH (Physical Uplink Control Channel), which is an uplink control channel. User data and higher control information are transmitted by means of this PUSCH. Furthermore, the PUCCH transmits downlink radio quality information (CQI: Channel Quality Indicator), ACK/NACK, and so on.

Figure 11:
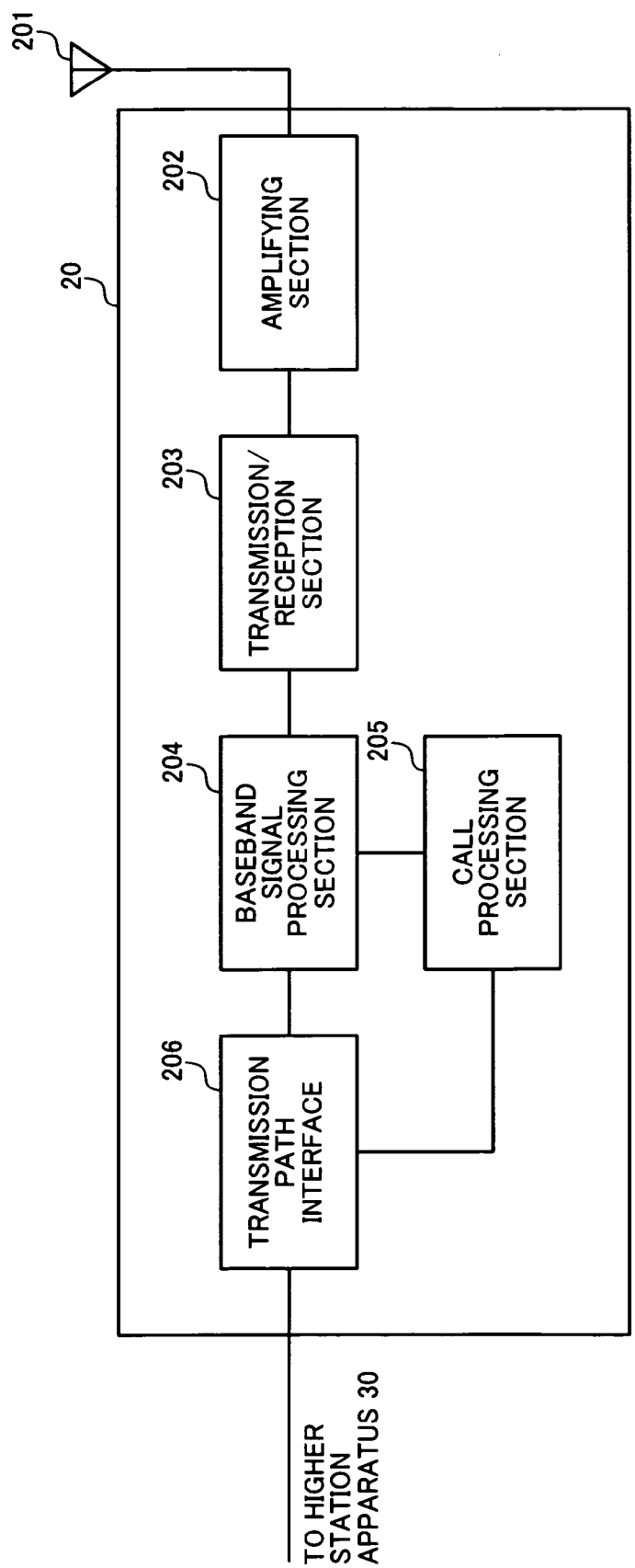
FIG. 11 is a diagram to explain an overall configuration of a base station apparatus.

Referring to FIG. 11, an overall configuration of the base station apparatus 20 according to the present embodiment will be described. The base station apparatus 20 has a transmitting/receiving antenna 201, an amplifying section 202, a transmission/reception section 203, a baseband signal processing section 204, a call processing section 205 and a transmission path interface 206. User data that is transmitted on the downlink from the base station apparatus 20 to the mobile terminal apparatus 10 is input in the baseband signal processing section 204, through the transmission path interface 206, from the higher station apparatus 30.

In the baseband signal processing section 204, a downlink data channel signal is subjected to PDCP layer processing, RLC (Radio Link Control) layer transmission processing such as division and coupling of user data and RLC retransmission control transmission processing, MAC (Medium Access Control) retransmission control, including, for example, HARQ (Hybrid Automatic Repeat reQuest) transmission processing, scheduling, transport format selection, channel coding, inverse fast Fourier transform (IFFT) processing, and precoding processing. Furthermore, as with signals of the physical downlink control channel, which is a downlink control channel, transmission processing is performed, including channel coding and inverse fast Fourier transform.

Also, the baseband signal processing section 204 notifies control information for allowing the mobile terminal apparatus 10 to communicate with the base station apparatus 20, to the mobile terminal apparatuses 10 connected to the same cell 50, by a broadcast channel. Broadcast information for communication in the cell 50 includes, for example, the uplink or downlink system bandwidth, identification information of a root sequence (root sequence index) for generating random access preamble signals in the PRACH (Physical Random Access channel), and so on.

In the transmission/reception section 203, the baseband signal output from the baseband signal processing section 204 is subjected to frequency conversion processing into a radio frequency band. The amplifying section 202 amplifies the transmission signal having been subjected to frequency conversion, and outputs the result to the transmitting/receiving antenna 201.

Meanwhile, as for signals to be transmitted on the uplink from the mobile terminal apparatus 10 to the base station apparatus 20, a radio frequency signal that is received in the transmitting/receiving antenna 201 is amplified in the amplifying section 202, subjected to frequency conversion and converted into a baseband signal in the transmission/reception section 203, and is input to the baseband signal processing section 204.

The baseband signal processing section 204 performs FFT processing, IDFT processing, error correction decoding, MAC retransmission control reception processing, and RLC layer and PDCP layer reception processing of the user data included in the baseband signal that is received on the uplink. The decoded signal is transferred to the higher station apparatus 30 through the transmission path interface 206.

The call processing section 205 performs call processing such as setting up and releasing a communication channel, manages the state of the base station apparatus 20 and manages the radio resources.

Figure 12:
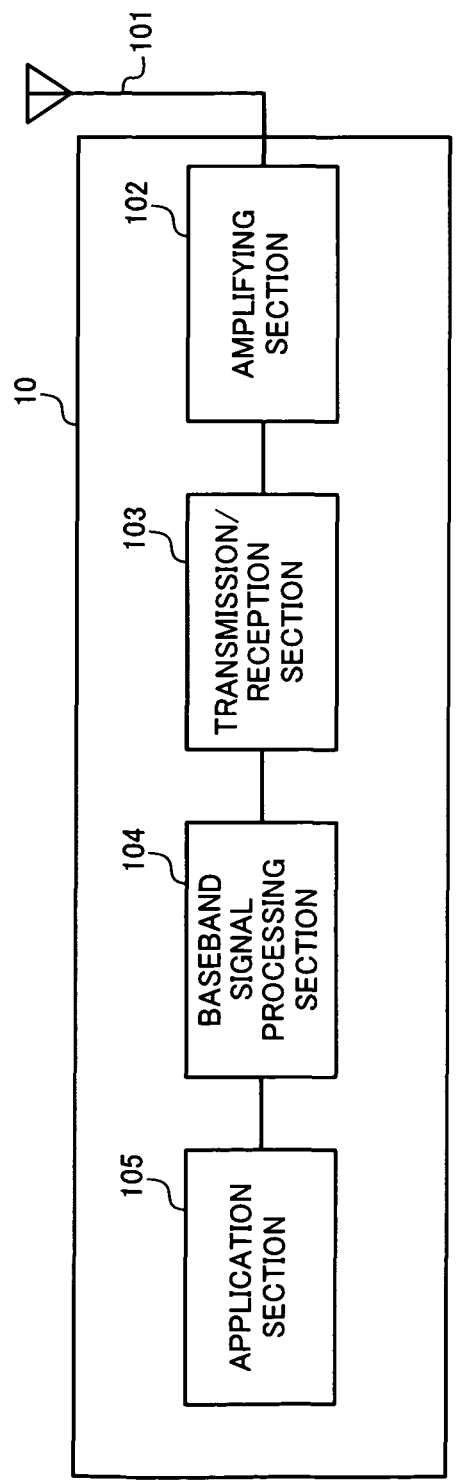
FIG. 12 is a diagram to explain an overall configuration of a mobile terminal apparatus.

Next, referring to FIG. 12, an overall configuration of the mobile terminal apparatus 10 according to the present embodiment will be described. An LTE terminal and an LTE-A terminal have the same hardware configurations in the principle parts, and therefore will be described indiscriminately. The mobile terminal apparatus 10 has a transmitting/receiving antenna 101, an amplifying section 102, a transmission/reception section 103, a baseband signal processing section 104 and an application section 105.

As for downlink data, a radio frequency signal received in the transmitting/receiving antenna 101 is amplified in the amplifying section 102, and subjected to frequency conversion and converted into a baseband signal in the transmission/reception section 103. This baseband signal is subjected to reception processing such as FFT processing, error correction decoding and retransmission control and so on, in the baseband signal processing section 104. In this downlink data, downlink user data is transferred to the application section 105. The application section 105 performs processing related to higher layers above the physical layer and the MAC layer. Also, in the downlink data, broadcast information is also transferred to the application section 105.

On the other hand, uplink user data is input from the application section 105 to the baseband signal processing section 104 by maximum two transport blocks. In the baseband signal processing section 104, mapping processing to each layer of the transport blocks, retransmission control (HARQ (Hybrid ARQ)) transmission processing, channel coding, DFT processing, IFFT processing and so on are performed. The baseband signal output from the baseband signal processing section 104 is subjected to frequency conversion processing in the transmission/reception section 103 and converted into a radio frequency band, and, after that, amplified in the amplifying section 102 and transmitted from the transmitting/receiving antenna 101.

Figure 13:
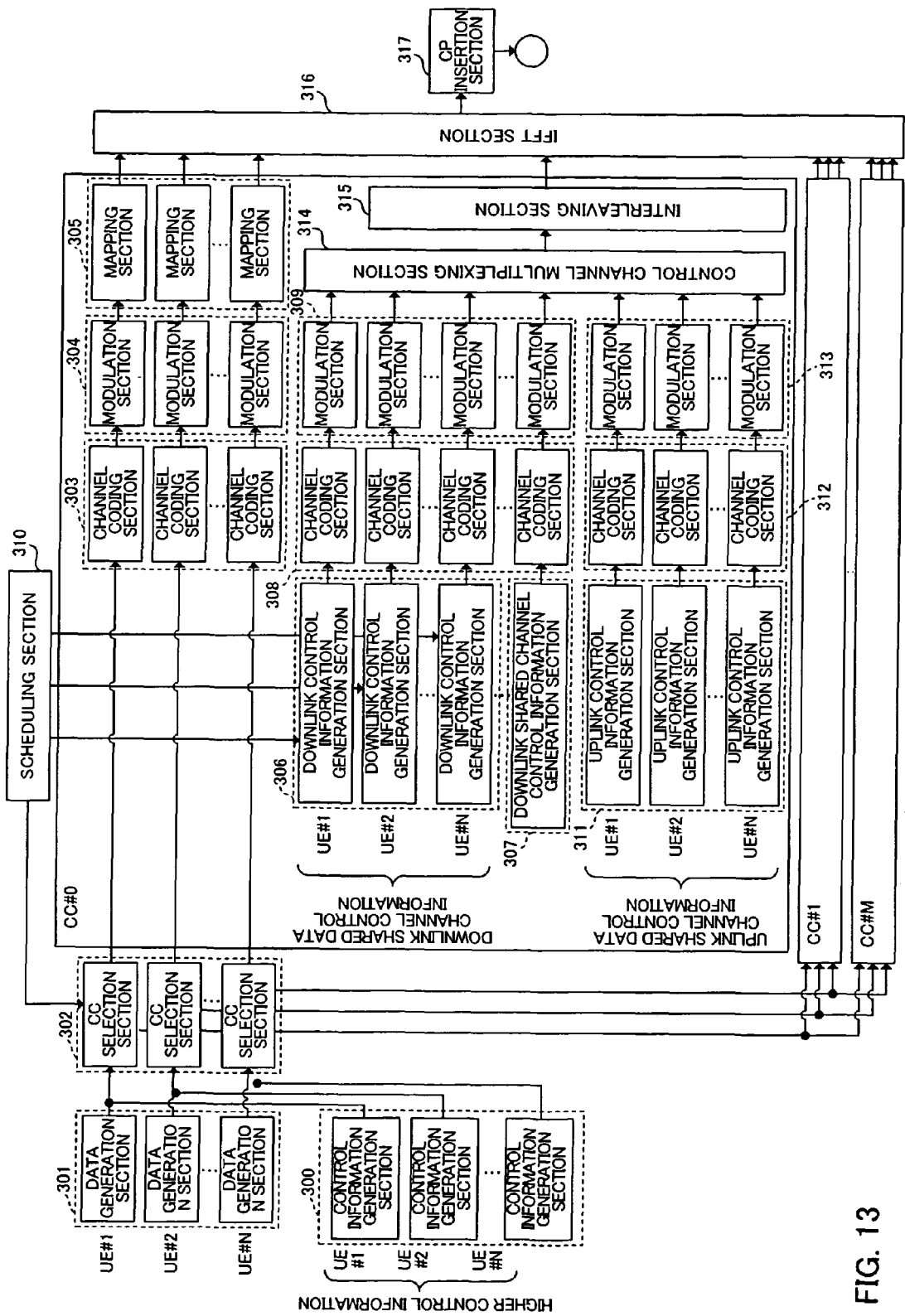
FIG. 13 is a functional block diagram of a baseband signal processing section provided in a base station apparatus.

FIG. 13 is a functional block diagram of the baseband signal processing section 204 and part of the higher layers provided in the base station apparatus 20 according to the present embodiment, and primarily illustrates the function blocks of the transmission processing section in the baseband signal processing section 204. FIG. 13 illustrates an example of a base station configuration which can support maximum M (CC #1 to CC #M) component carriers. Transmission data for the mobile terminal apparatus 10 under control of the base station apparatus 20 is transferred from the higher station apparatus 30 to the base station apparatus 20.

A control information generation section 300 generates higher control information for performing higher layer signaling (for example, RRC signaling), on a per-user basis. In the higher control information, the above-described offset values $A^{(l)}$, $B^{(l)}$, $C^{(l)}$ and $D^{(l)}$ and the resource block indices $I_1$, $I_2$, $I_3$ and $I_4$ and so on can be included. However, when the offset values and resource block indices are defined in advance between the base station apparatus 20 and the mobile terminal apparatus 10 on a fixed basis, it is not necessary to include the offset values and resource block indices in the higher control information.

A data generation section 301 outputs the transmission data transferred from the higher station apparatus 30 separately as user data. A component carrier selection section 302 selects component carriers to use in radio communication with the mobile terminal apparatus 10 on a per-user basis.

A scheduling section 310 controls assignment of component carriers to a serving mobile terminal apparatus 10 according to overall communication quality of the system band. Also, the scheduling section 310 controls resource allocation in component carriers CC #1 to CC #M. The LTE terminal user and the LTE-A terminal user are scheduled separately. The scheduling section 310 receives as input the transmission data and retransmission command from the higher station apparatus 30, and also receives as input the channel estimation values and resource block CQIs from the reception section having measured an uplink received signal. The scheduling section 310 schedules uplink and downlink control information and uplink and downlink shared channel signals, with reference to the retransmission command, channel estimation values and CQIs that are received as input from the higher station apparatus 30. A propagation path in mobile communication varies differently per frequency, due to frequency selective fading. So, upon transmission of user data to the mobile terminal apparatus 10, resource blocks of good communication quality are assigned to each mobile terminal apparatus 10, on a per-subframe basis (which is referred to as "adaptive frequency scheduling"). In adaptive frequency scheduling, for each resource block, a mobile terminal apparatus 10 of good propagation path quality is selected and assigned. Consequently, the scheduling section 310 assigns resource blocks, using the CQI of each resource block, fed back from each mobile terminal apparatus 10. Also, the MCS (coding rate and modulation scheme) to fulfill a required block error rate with the assigned resource blocks is determined. Parameters to fulfill the MCS (coding rate and modulation scheme) determined by the scheduling section 310 are set in channel coding sections 303, 308 and 312, and in modulation sections 304, 309 and 313.

Also, the scheduling section 310 allocates PHICH resources to transmit HARQ ACK/NACK, based on the offset values and resource block indices that are set on a per-transport block (layer) basis. For example, the scheduling section 310 performs PHICH resource allocation, per transport block (layer), using the offset values that are defined between the base station apparatus 20 and the mobile terminal apparatus 10 on a fixed basis, by the above-described first PHICH resource allocation method. Then, different values are set in the offset values $C^{(l)}$ and $D^{(l)}$ for every transport block (layer). Consequently, even when single-user MIMO is employed on the uplink to support two PHICHs, collision of PHICH resources corresponding to respective transport blocks (layers) is prevented. The scheduling section 310 may also perform PHICH resource allocation on a per-transport block (layer) basis using the above-described second to fifth PHICH resource allocation methods.

The baseband signal processing section 204 has channel coding sections 303, modulation sections 304, and mapping sections 305, to match the maximum number of users to be multiplexed, N, in one component carrier. The channel coding section 303 performs channel coding of the shared data channel (PDSCH), which is formed with user data (including part of higher control signals) that is output from the data generation section 301, on a per-user basis. The modulation section 304 modulates user data having been subjected to channel coding, on a per-user basis. The mapping section 305 maps the modulated user data to radio resources.

Also, the baseband signal processing section 204 has a downlink control information generation section 306 that generates downlink shared data channel control information, which is user-specific downlink control information, and a downlink shared channel control information generation section 307 that generates downlink shared control channel control information, which is user-common downlink control information.

The downlink control information generation section 306 generates PDCCH downlink control signals (DCI) from the resource allocation information, PUCCH transmission power control command, which are determined on a per-user basis. Also, the downlink control information generation section 306 generates HARQ ACK/NACK for a transport block received on the uplink.

The baseband signal processing section 204 has channel coding sections 308 and modulation sections 309 to match the maximum number of users to be multiplexed, N, in one component carrier. The channel coding section 308 performs, on a per-user basis, channel coding of control information, which is generated in the downlink control information generation section 306 and the downlink shared channel control information generation section 307. The modulation section 309 modulates the downlink control information having been subjected to channel coding.

Also, the baseband signal processing section 204 has an uplink control information generation section 311, a channel coding section 312, and a modulation section 313. The uplink control information generation section 311 generates, on a per-user basis, uplink shared data channel control information (UL grant and so on), which is control information for controlling the uplink shared data channel (PUSCH). Note that the uplink shared data channel control information may include information related to the cluster arrangement for executing cluster division. The channel coding section 312 performs, on a per-user basis, channel coding of uplink shared data channel control information, and the modulation section 313 modulates the uplink shared data channel control information having been subjected to channel coding, on a per-user basis.

The control information that is modulated on a per-user basis in the above modulation sections 309 and 313 is multiplexed in a control channel multiplexing section 314 and furthermore interleaved in an interleaving section 315. A control signal that is output from the interleaving section 315 and user data that is output from the mapping section 305 are input in an IFFT section 316 as downlink channel signals. The IFFT section 316 converts the downlink channel signal from a frequency domain signal into a time sequence signal by performing an inverse fast Fourier transform of the downlink channel signal. A cyclic prefix insertion section 317 inserts cyclic prefixes in the time sequence signal of the downlink channel signal. Note that a cyclic prefix functions as a guard interval for cancelling the differences in multipath propagation delay. The transmission data to which cyclic prefixes are added, is transmitted to the transmission/reception section 203.

Figure 14:
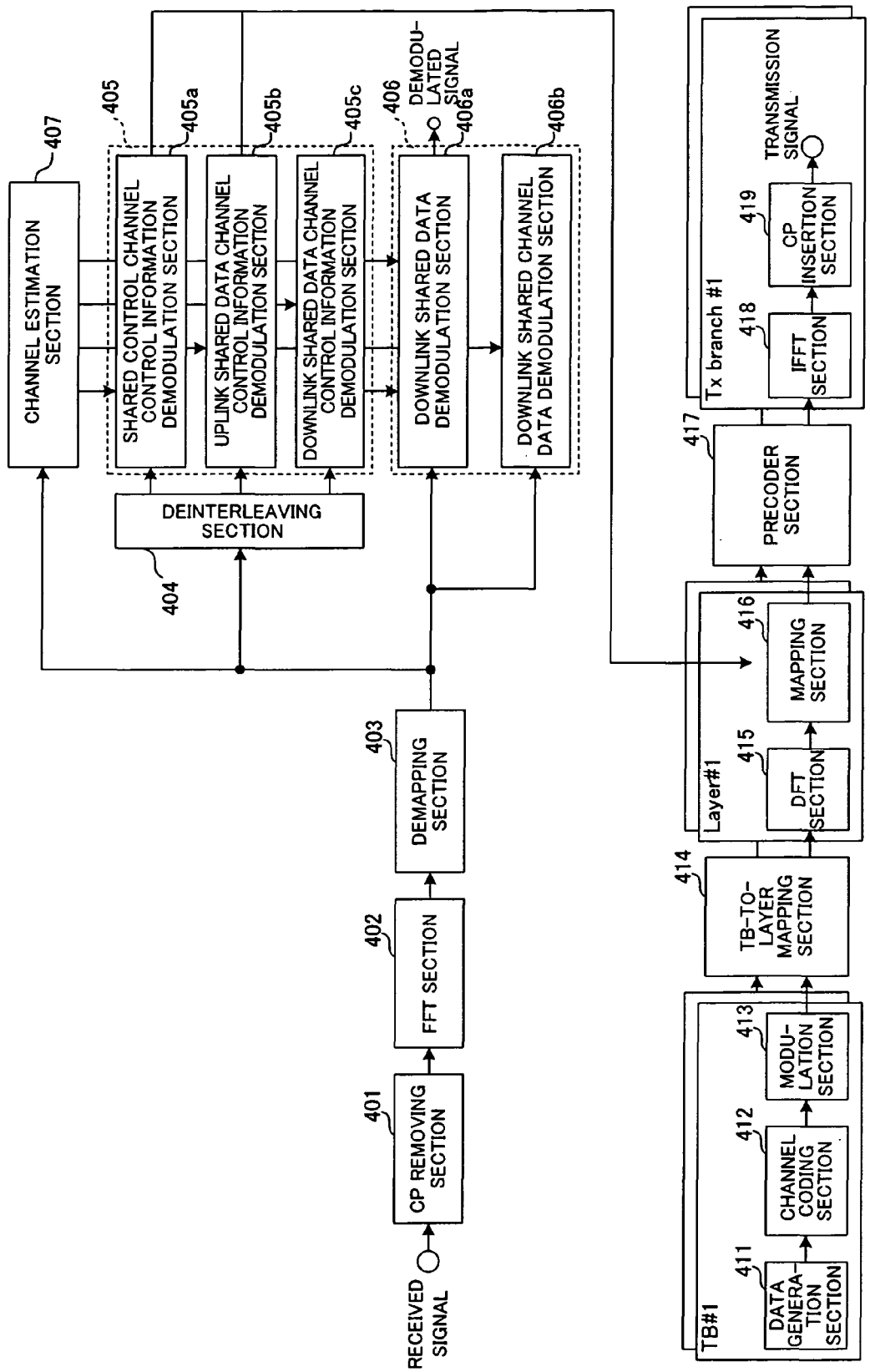
FIG. 14 is a functional block diagram of a baseband signal processing section provided in a mobile terminal apparatus.

FIG. 14 is a functional block diagram of the baseband signal processing section 104 provided in the mobile terminal apparatus 10, illustrating function blocks of an LTE-A terminal which supports LTE-A. First, the downlink configuration of the mobile terminal apparatus 10 will be described.

A CP removing section 401 removes the CPs from a downlink signal received from the radio base station apparatus 20 as received data. The downlink signal, from which the CPs have been removed, is input in an FFT section 402. The FFT section 402 performs a fast Fourier transform (FFT) on the downlink signal, converts the time-domain signal into a frequency domain signal, and inputs the frequency domain signal in a demapping section 403. The demapping section 403 demaps the downlink signal, and extracts, from the downlink signal, multiplexed control information in which a plurality of pieces of control information are multiplexed, user data, and higher control signals. Note that the demapping process by the demapping section 403 is performed based on higher control information that is received as input from the application section 105. The multiplexed control information that is output from the demapping section 403 is deinterleaved in a deinterleaving section 404.

Also, the baseband signal processing section 104 has a control information demodulation section 405 that demodulates control information, a data demodulation section 406 that demodulates downlink shared data, and a channel estimation section 407. The control information demodulation section 405 includes a shared control channel control information demodulation section 405a that demodulates downlink shared control channel control information from the multiplexed control information, an uplink shared data channel control information demodulation section 405b that demodulates uplink shared data channel control information from the multiplexed control information, and a downlink shared data channel control information demodulation section 405c that demodulates downlink shared data channel control information from the multiplexed control information. The data demodulation section 406 includes a downlink shared data demodulation section 406a that demodulates the user data and higher control signals, and a downlink shared channel data demodulation section 406b that demodulates downlink shared channel data.

The shared control channel control information demodulation section 405a extracts shared control channel control information, which is user-common control information, by the blind decoding process, demodulation process, channel decoding process and so on of the common search space of the multiplexed control information (PDCCH). The shared control channel control information includes downlink channel quality information (CQI), and therefore is input in a mapping section 416 (described later), and mapped as part of transmission data for the base station apparatus 20.

The uplink shared data channel control information demodulation section 405b extracts uplink shared data channel control information, which is user-specific uplink control information, by the blind decoding process, demodulation process, channel decoding process and so on, of the user-specific search spaces of the multiplexed control information (PDCCH). For the uplink shared data channel control information, for example, information related to the lowest resource block index $I_{low}$ for uplink transmission and cluster arrangement is extracted. The uplink shared data channel control information is used to control the uplink shared data channel (PUSCH), and is input in the downlink shared data channel control information demodulation section 405c and the downlink shared channel data demodulation section 406b.

The downlink shared data channel control information demodulation section 405c extracts downlink shared data channel control information, which is user-specific downlink control signals, by the blind decoding process, demodulation process, channel decoding process and so on of the user-specific search spaces of the multiplexed control information (PDCCH). The downlink shared data channel control information is used to control the downlink shared data channel (PDSCH), and is input in the downlink shared data demodulation section 406a. Also, the downlink shared data channel control information demodulation section 405c performs the blind decoding process of the user-specific search space, based on information which relates to the PDCCH and PDSCH and which is included in higher control signals demodulated in the downlink shared data demodulation section 406a.

Also, for the downlink shared data channel control information, HARQ ACK/NACK is extracted. In this case, the downlink shared data channel control information demodulation section 405c specifies the PHICH resources based on the offset values that are defined between the base station apparatus 20 and the mobile terminal apparatus 10 on a fixed basis, and extracts HARQ ACK/NACK. Also, the downlink shared data channel control information demodulation section 405c may as well specify the PHICH resources based on the offset values and resource block indices reported from the base station apparatus 20 by RRC signaling, and extract HARQ ACK/NACK. Note that, when PHICH resources are specified by the offset values and resource block indices, these are specified using equation 2 to equation 7 as appropriate.

The downlink shared data demodulation section 406a acquires the user data, higher control information and so on, based on the downlink shared data channel control information received as input from the downlink shared data channel control information demodulation section 405c. The higher control information is output to the channel estimation section 407. The downlink shared channel data demodulation section 406b demodulates downlink shared channel data based on the uplink shared data channel control information that is input from the uplink shared data channel control information demodulation section 405b.

The channel estimation section 407 performs channel estimation using UE-specific demodulation reference signals or common reference signals. The estimated channel variation is output to the shared control channel control information demodulation section 405a, the uplink shared data channel control information demodulation section 405b, the downlink shared data channel control information demodulation section 405c and the downlink shared data demodulation section 406a. These demodulation sections demodulate downlink signals using the estimated channel variation and demodulation reference signals.

The baseband signal processing section 104 has, for every transport block (TBs #1 and #2), a data generation section 411, a channel coding section 412, a modulation section 413, which are provided as transmission processing sequence function blocks. The data generation section 411 generates transmission data from bit data that is received as input from the application section 105. The channel coding section 412 applies channel coding processing such as error correction and so on to the transmission data, and the modulation section 413 modulates the transmission data having been subjected to channel coding by QPSK and so on.

A TB-to-layer mapping section 414 is provided after the modulation section 413 of each transport block. The TB-to-layer mapping section 414 maps a codeword (data symbol) received as input from the modulation section 413 of each transport block to each layer. The number of layers can be an arbitrary value from 1 to the maximum number of antenna ports. With the transmission processing sequence of the mobile terminal apparatus 10 of the present embodiment, two layers (layers #1 and #2) support two antenna ports (Tx branches #1 and #2).

After the TB-to-layer mapping section 414, a DFT section 415 and a mapping section 416 are provided per transport block (layer). The DFT section 415 performs a discrete Fourier transform on the data symbol after the layer mapping. The mapping section 416 maps the frequency components of the data symbol after the DFT to the subcarrier positions designated by the base station apparatus 20.

A precoder section 417 is provided after the mapping section 416. The precoder section 417 performs mapping for each antenna port by multiplying a precoder matrix upon the data symbol mapped to each transport block (layer). An IFFT section 418 and a CP insertion section 419 are provided after the precoder section 417 for every antenna port. The IFFT section 416 converts input data matching the system band into time sequence data by performing an inverse fast Fourier transform, and the CP insertion section 417 inserts cyclic prefixes in the time sequence data per data division.

As described above, with the base station apparatus 20 according to the present embodiment, HARQ ACK/NACK for uplink transport blocks associated with a plurality of space-multiplexed layers is allocated to PHICH resources, by using the offset values that are set with the mobile terminal apparatus 10 on a fixed basis. By means of this configuration, even when uplink single-user MIMO is supported, collision of PHICH resources for respective TBs is prevented. Also, it is not necessary to report offset values from the base station apparatus 20 to the mobile terminal apparatus 10, and it is therefore not necessary to increase the control signal overhead.

Note that although the above embodiment is configured to allocate PHICH resources in a scheduling section in the base station apparatus, this configuration is by no means limiting. Insofar as PHICH resources are allocated in accordance with information related to offset values, cluster arrangement and so on, allocation may be performed in any part in the base station apparatus.

Also, although the above embodiment is configured to specify PHICH resources in a downlink shared data channel control information demodulation section in the mobile terminal apparatus, this configuration is by no means limiting. As long as the mobile terminal apparatus is able to specify PHICH resources based on offset values and so on, PHICH resources may be specified outside the downlink shared data channel control information demodulation section as well.

Also, although the above embodiment is configured to allocate PHICH resources using equation 2 to equation 7, this configuration is by no means limiting. As long as PHICH resources do not collide between transport blocks (layers), it is equally possible to provide a configuration to allocate PHICH resources using modifications of equation 2 to equation 7.

The present invention is by no means limited to the above embodiment and can be implemented in various modifications. For example, without departing from the spirit of the present invention, it is possible to change the assignment of component carriers, the number of processing parts, the steps of processing, the number of component carriers and the cardinal number of component carriers in the above description as appropriate. Other changes are also possible as appropriate without departing from the spirit of the present invention.

The disclosure of Japanese Patent Application No. 2010-105939, filed on Apr. 30, 2010, including the specification, drawings, and abstract, is incorporated herein by reference in its entirety.

The invention claimed is:

1. A base station apparatus comprising:
a receiving section configured to receive spatially-multiplexed signals corresponding to a plurality of layers via an uplink from a single mobile terminal apparatus;
a response signal generation section configured to generate response signals for retransmission in response to transport blocks associated with the respective layers received on the uplink; and
an allocation section configured to allocate the response signals for the transport blocks associated with the layers to Physical Hybrid ARQ Indicator CHannel (PHICH) resources by using PHICH offset values that are fixedly defined in advance between the base station apparatus and the single mobile terminal apparatus for the respective transport blocks of the uplink,
wherein the PHICH offset values are added to Physical Resource Block (PRB) indexes that are used to determine the PHICH resources to which the response signals for the transport blocks associated with the layers are allocated.

2. The base station apparatus as defined in claim 1, wherein the transport blocks comprise a first transport block and a second transport block that are associated with mutually different layers, a PHICH resource for the first transport block is allocated corresponding to a lowest resource block index and a PHICH resource for the second transport block is allocated corresponding to a second lowest resource block index that is adjacent to the lowest resource block index.

3. The base station apparatus as defined in claim 1, wherein:
the receiving section receives the signals in which the layers are spatially-multiplexed, in clustered resource blocks that are used in common between the layers for uplink transmission;
the PHICH offset values are values that are defined such that a resource block index of a different cluster is selected for each of the layers, from resource block indices respectively indicating the clustered resource blocks; and
the allocation section allocates the response signals for the transport blocks to PHICH resources corresponding to the resource block indices selected based on the PHICH offset values.

4. The base station apparatus as defined in claim 3, wherein the PHICH offset values are values that are defined such that a lowest index of a different cluster is selected for each of the layers, from the resource block indices respectively indicating the clustered resource blocks.

5. The base station apparatus as defined in claim 1, wherein:
the PHICH offset values are values that are defined such that a cyclic shift value of an uplink demodulation reference signal, which is set in common between the layers, is made different for each of the layers; and
the allocation section allocates the response signals for the transport blocks to the PHICH resources in accordance with the cyclic shift value.

6. A single mobile terminal apparatus comprising:
a transmission section configured to transmit spatially-multiplexed signals corresponding to a plurality of layers via an uplink to a base station apparatus;
a resource specifying section configured to specify Physical Hybrid ARQ Indicator CHannel (PHICH) resources of response signals for retransmission from the base station apparatus in response to signals transmitted by the layers, by using PHICH offset values that are fixedly defined in advance between the single mobile terminal apparatus and the base station apparatus for transport blocks associated with the respective layer of the uplink; and
a response signal acquiring section configured to acquire the response signals of the PHICH resources specified in the resource specifying section,
wherein the PHICH offset values are added to Physical Resource Block (PRB) indexes that are used to determine the PHICH resources to which the response signals for the transport blocks associated with the layers are allocated.

7. The single mobile terminal apparatus as defined in claim 6, wherein the transport blocks comprise a first transport block and a second transport block that are associated with mutually different layers, a PHICH resource for the first transport block is allocated corresponding to a lowest resource block index and a PHICH resource for the second transport block is allocated corresponding to a second lowest resource block index that is adjacent to the lowest resource block index.

8. The single mobile terminal apparatus as defined in claim 6, wherein:
the transmission section transmits the signals in which the layers are spatially-multiplexed, in a plurality of clustered resource blocks that are used in common between the layers for uplink transmission;
the PHICH offset values are values that are defined such that a resource block index of a different cluster is selected for each of the layers, from resource block indices respectively indicating the clustered resource blocks; and
the resource specifying section specifies the PHICH resources corresponding to the respective resource block indices selected based on the PHICH offset values.

9. The single mobile terminal apparatus as defined in claim 8, wherein the PHICH offset values are values that are defined such that a lowest index of a different cluster is selected for each of the layers, from the resource block indices respectively indicating the clustered resource blocks.

10. The single mobile terminal apparatus as defined in claim 6, wherein:
the PHICH offset values are values that are defined such that a cyclic shift value of an uplink demodulation reference signal, which is set in common between the layers, varies between the layers; and
the resource specifying section specifies the PHICH resources based on the cyclic shift value.

11. A communication control method for a base station apparatus comprising the steps of:
receiving spatially-multiplexed signals corresponding to a plurality of layers via an uplink from a single mobile terminal apparatus;
generating response signals for retransmission in response to transport blocks associated with the respective layers received on the uplink; and allocating the response signals for the transport blocks associated with the respective layers to Physical Hybrid ARQ Indicator CHannel (PHICH) resources by using PHICH offset values that are fixedly defined in advance with the single mobile terminal apparatus for the respective transport blocks of the uplink, wherein the PHICH offset values are added to Physical Resource Block (PRB) indexes that are used to determine the PHICH resources to which the response signals for the transport blocks associated with the layers are allocated.

12. The communication control method as defined in claim 11, wherein the transport blocks comprise a first transport block and a second transport block that are associated with mutually different layers, a PHICH resource for the first transport block is allocated corresponding to a lowest resource block index and a PHICH resource for the second transport block is allocated corresponding to a second lowest resource block index that is adjacent to the lowest resource block index.

13. A radio communication system comprising a base station apparatus and a single mobile terminal apparatus communicating with the base station apparatus, the base station apparatus having:
  a receiving section configured to receive spatially-multiplexed signals corresponding to a plurality of layers via an uplink from the single mobile terminal apparatus;
  a response signal generation section configured to generate response signals for retransmission in response to transport blocks associated with the respective layers received on the uplink; and
  an allocation section configured to allocate the response signals for the transport blocks associated with the layers to Physical Hybrid ARQ Indicator CHannel (PHICH) resources by using PHICH offset values that are fixedly defined in advance between the base station apparatus and the single mobile terminal apparatus for the respective transport blocks of the uplink, wherein the PHICH offset values are added to Physical Resource Block (PRB) indexes that are used to determine the PHICH resources to which the response signals for the transport blocks associated with the layers are allocated.

14. The radio communication system as defined in claim 13, wherein the transport blocks comprise a first transport block and a second transport block that are associated with mutually different layers, a PHICH resource for the first transport block is allocated corresponding to a lowest resource block index and a PHICH resource for the second transport block is allocated corresponding to a second lowest resource block index that is adjacent to the lowest resource block index.

* * * * *